United States Patent
Ibuki et al.

(10) Patent No.: US 11,647,169 B2
(45) Date of Patent: May 9, 2023

(54) REFLECTIVE SCREEN AND PROJECTION IMAGE DISPLAY SYSTEM

(71) Applicant: FUJIFILM Corporation, Tokyo (JP)

(72) Inventors: Shuntaro Ibuki, Minamiashigara (JP); Naoya Nishimura, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/942,606

(22) Filed: Sep. 12, 2022

(65) Prior Publication Data

US 2023/0037337 A1 Feb. 9, 2023

Related U.S. Application Data

(63) Continuation of application No. PCT/JP2021/008718, filed on Mar. 5, 2021.

(30) Foreign Application Priority Data

Mar. 13, 2020 (JP) .............................. JP2020-043848
Nov. 19, 2020 (JP) .............................. JP2020-192373

(51) Int. Cl.
*H04N 9/31* (2006.01)
*G02F 1/1335* (2006.01)

(52) U.S. Cl.
CPC ..... *H04N 9/3152* (2013.01); *G02F 1/133536* (2013.01); *G02F 1/133543* (2021.01)

(58) Field of Classification Search
None
See application file for complete search history.

(56) References Cited

U.S. PATENT DOCUMENTS

2003/0218708 A1* 11/2003 Ichihashi ............ G02F 1/13362
349/171
2005/0057804 A1* 3/2005 Umeya ................ G03B 21/625
359/449

(Continued)

FOREIGN PATENT DOCUMENTS

JP 6-95097 A 4/1994
JP 2000-28807 A 1/2000

(Continued)

OTHER PUBLICATIONS

International Preliminary Report on Patentability and English translation of the Written Opinion of the International Searching Authority (Forms PCT/IB/326, PCT/IB/373 and PCT/ISA/237) for International Application No. PCT/JP2021/008718, dated Sep. 22, 2022.

(Continued)

*Primary Examiner* — Ryan Crockett
(74) *Attorney, Agent, or Firm* — Birch, Stewart, Kolasch & Birch, LLP

(57) ABSTRACT

Provided is a reflective screen and a projection image display system in which a transmittance of light can be selectively changed, a transmittance in a transparent state is sufficiently high, a voltage does not need to be applied constantly, and a voltage is applied to decrease a transmittance of light in a case where the reflective screen is irradiated with video light. The reflective screen includes: a light reflecting layer that is formed of a cholesteric liquid crystal layer and where a selective reflection wavelength at a polar angle of 60° is present in a visible range, in which senses of helix of all of cholesteric liquid crystal layers are the same and Expression (1) is satisfied; and a transparent first electrode, a transparent second electrode, and a light control layer that are provided on a rear side with respect to the light reflective layer, the light control layer being disposed between the first electrode and the second electrode, (Continued)

in which the light control layer includes a polymer network and liquid crystal molecules and changes between a first state where light is scattered and a second state where transmission of light is allowed by changing a magnitude of a voltage applied, the polymer network having a three-dimensional net shape having a plurality of domains, and the liquid crystal molecules being positioned in the domains.

$$R[-60,40](550)/R[-60,30](550) \geq 1.5 \qquad \text{Expression (1)}$$

20 Claims, 2 Drawing Sheets

(56) References Cited

U.S. PATENT DOCUMENTS

| | | | | |
|---|---|---|---|---|
| 2007/0133090 | A1* | 6/2007 | Adachi | G03B 21/604 359/453 |
| 2012/0140133 | A1 | 6/2012 | Choi et al. | |
| 2015/0301366 | A1 | 10/2015 | Gayout et al. | |
| 2017/0059982 | A1* | 3/2017 | Watanabe | C09D 133/12 |
| 2019/0204646 | A1* | 7/2019 | Ohmuro | G02F 1/133528 |
| 2023/0037337 | A1* | 2/2023 | Ibuki | G02F 1/133536 |

FOREIGN PATENT DOCUMENTS

| | | |
|---|---|---|
| JP | 2005-37735 A | 2/2005 |
| JP | 2005-55887 A | 3/2005 |
| JP | 2015-212800 A | 11/2015 |
| JP | 2016-503510 A | 2/2016 |
| JP | 2019-38707 A | 3/2019 |
| JP | 2019-132973 A | 8/2019 |

OTHER PUBLICATIONS

International Search Report (Form PCT/ISA/210) for International Application No. PCT/JP2021/008718, dated May 25, 2021, with English translation.

* cited by examiner

REFLECTIVE SCREEN AND PROJECTION IMAGE DISPLAY SYSTEM

CROSS-REFERENCE TO RELATED APPLICATIONS

This application is a Continuation of PCT International Application No. PCT/JP2021/008718 filed on Mar. 5, 2021, which claims priority under 35 U.S.C. § 119(a) to Japanese Patent Application No. 2020-043848 filed on Mar. 13, 2020 and Japanese Patent Application No. 2020-192373 filed on Nov. 19, 2020. Each of the above applications is hereby expressly incorporated by reference, in its entirety, into the present application.

BACKGROUND OF THE INVENTION

1. Field of the Invention

The present invention relates to a reflective screen in which a transmittance of light can be selectively changed and a projection image display system including the reflective screen.

2. Description of the Related Art

In the related art, various techniques are developed as a reflective screen that reflects and displays video light projected from a video source. In particular, for example, a transparent reflective screen is bonded to a member having high transmittance such as window glass and reflects projected video light such that the video is highly visible. In addition, for example, in a case where the reflective screen does not project video light during non-use, a scenery on the opposite side of the screen is seen through the screen. Therefore, the demand increases from the viewpoint of high designability and the like. On the other hand, since the scenery on the opposite side of the screen is seen through the screen, in a case where the scenery is bright, the video may be difficult to see due to, for example, a decrease in the contrast of the video. In order to solve this problem, a reflective screen in which a transmittance of light can be selectively changed is disclosed (JP2019-132973A).

In addition, a rear projection type transparent screen that allows transmission of light from a rear surface to display a video is also present. However, a component diffused by fine particles is used in many cases, and the amount of diffused light also increases in a case where a scenery is bright. Therefore, there is no unit for improving visibility (JP2015-212800A).

SUMMARY OF THE INVENTION

However, in the reflective screen described in JP2019-132973A, a highest transmittance is 30% or more and 50% or less, a scenery on the opposite side is difficult to see, and a state where a voltage is applied needs to be constantly maintained to maintain the transparent state. Even in a case where video light is projected to be superimposed on a scenery such as a night view in a state where a light is seen in the dark, the state where a voltage is applied is necessary, the power consumption is high, and power failure is likely to occur.

An object of the present invention is to provide: a reflective screen in which a transmittance of light can be selectively changed, a transmittance in a transparent state is sufficiently high, a voltage does not need to be applied constantly to maintain the transparent state, and a voltage is applied to decrease a transmittance of light only in a case where the reflective screen is irradiated with video light and a scenery is bright; and a projection image display system including the reflective screen.

The present invention achieves this object with the following configurations.

[1] A reflective screen that reflects video light projected from a projector to display a video and has transparency, the reflective screen comprising:

a light reflecting layer where a central wavelength of selective reflection at a polar angle of 60° is present in a visible range, in which at least one layer of the light reflecting layer is formed of a layer having a cholesteric liquid crystal structure, senses of helix of all of layers having a cholesteric liquid crystal structure are the same, and Expression (1) is satisfied; and a transparent first electrode, a transparent second electrode, and a light control layer that are provided on a rear side with respect to the light reflective layer in a thickness direction of the reflective screen, the second electrode being disposed to face the first electrode, and the light control layer being disposed between the first electrode and the second electrode, in which the light control layer includes a polymer network and liquid crystal molecules and changes between a first state where light is scattered and a second state where transmission of light is allowed by changing a magnitude of a voltage applied to the light control layer through the first electrode and the second electrode, the polymer network having a three-dimensional net shape having a plurality of domains, and the liquid crystal molecules being positioned in the domains, $$R[-60,40](550)/R[-60,30](550) \geq 1.5 \quad \text{Expression (1)}$$

where $R[-60,40](550)$ represents a reflectivity at a wavelength of 550 nm with respect to incidence light incident into the reflective screen at a polar angle of $-60°$ that is measured at a light receiving angle having a polar angle of $40°$ with respect to an azimuthal angle shifted by $180°$ from an azimuthal angle of the incidence light, and $R[-60,30](550)$ represents a reflectivity at a wavelength of 550 nm with respect to incidence light incident into the reflective screen at a polar angle of $-60°$ that is measured at a light receiving angle having a polar angle of $30°$ with respect to an azimuthal angle shifted by $180°$ from an azimuthal angle of the incidence light.

[2] The reflective screen according to [1],
in which the layer having a cholesteric liquid crystal structure is a cholesteric liquid crystal layer that is formed in a layer shape.

[3] The reflective screen according to [2],
in which the cholesteric liquid crystal layer has a stripe pattern including bright portions and dark portions that is observed with a scanning electron microscope in a cross-section, the stripe pattern has a waving structure, and an average value of peak-to-peak distances of the waving structure is 0.5 μm to 50 μm, the waving structure refers to a structure in which at least one region M where an absolute value of an inclined angle of a continuous line of the bright portions or the dark portions in the stripe pattern with respect to a plane of the cholesteric liquid crystal layer is 5° or more is present, and peaks or valleys having an inclined angle of 0° are specified at two points most adjacent to each other with the region M interposed between the two points, and the peak-to-peak distance of the waving structure refers to a value obtained by measuring a distance in a plane direction of the cholesteric liquid crystal layer between the peaks or the valleys having an inclined angle of 0° at the two points most adjacent to each other with the region M interposed between the two points and obtaining an average of distance values at all thicknesses in a case where the length of the cholesteric liquid crystal layer in a major axis direction of the cross-section is 100 µm.

[4] The reflective screen according to any one of [1] to [3], in which a maximum reflectivity of integral reflectivity at a wavelength of 620 to 680 nm is 15% to 28%.

[5] The reflective screen according to any one of [1] to [4], in which a transmittance of the reflective screen in a state where a transmittance of the light control layer is the highest is 51% or more and 85% or less.

[6] The reflective screen according to any one of [1] to [5], in which an average value of domain diameters of the polymer network is 0.1 µm or more and 3µm or less.

[7] The reflective screen according to any one of [1] to [6], in which a thickness of the light control layer is 5 µm or more and 50 µm or less.

[8] The reflective screen according to any one of [1] to [7], in which in the light control layer, a density of the domains is $2 \times 10^7$ pieces/mm$^3$ or more and $2 \times 10^{12}$ pieces/mm$^3$ or less.

[9] The reflective screen according to any one of [1] to [8], further comprising:

a retardation layer A that consists of a λ/2 retardation layer or a λ/4 retardation layer.

[10] The reflective screen according to any one of [1] to [9], in which the light control layer is bonded to a transparent support through a pressure-sensitive adhesive layer, the transparent support supporting the light reflective layer.

[11] A projection image display system comprising:

the reflective screen according to any one of [1] to [10]; and a projector that projects video light to the reflective screen.

[12] The projection image display system according to [11], in which incidence light projected from the projector and incident into the reflective screen is p polarized light that vibrates in a direction parallel to an incident surface.

[13] The projection image display system according to [11] or [12], in which the incidence light is incident at an angle of 40° or more and 70° or less with respect to a normal line of the reflective screen.

[14] The projection image display system according to any one of [11] to [13], further comprising:

a voltage application unit; and a controller, in which the light control layer further includes a pair of alignment layers, among the pair of alignment layers, one alignment layer is positioned between a front surface of the light control layer and the first electrode and another alignment layer is positioned between a rear surface of the light control layer and the second electrode, the voltage application unit applies an alternating current voltage to the light control layer through the first electrode and the second electrode, and the controller controls driving of the projector and driving of the voltage application unit such that a period of a frame in the projector and a period of the alternating current voltage in the voltage application unit are different from each other.

According to the present invention, it is possible to provide: a reflective screen in which a transmittance of light can be selectively changed, a transmittance in a transparent state is sufficiently high, a voltage does not need to be applied constantly to maintain the transparent state, and a voltage is applied to decrease a transmittance of light only in a case where the reflective screen is irradiated with video light and a scenery is bright; and a projection image display system including the reflective screen.

DESCRIPTION OF THE PREFERRED EMBODIMENTS

Figure 1A:
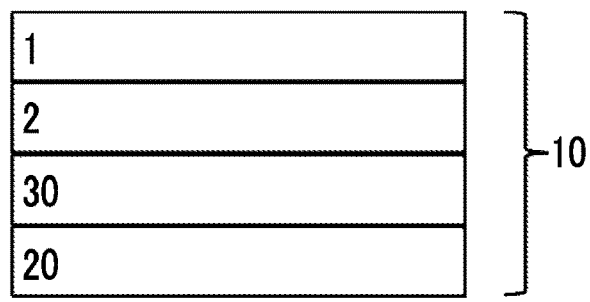
FIG. 1A is a diagram conceptually showing one example of a reflective screen according to the present invention.

Hereinafter, a reflective screen and a projection image display system according to an embodiment of the present invention will be described in detail. In the present specification, numerical ranges represented by "to" include numerical values before and after "to" as lower limit values and upper limit values.

In the present specification, for example, unless specified otherwise, an angle such as "45°", "parallel", "perpendicular", or "orthogonal" represents that a difference from an exact angle is less than 5 degrees. The difference from an exact angle is preferably less than 4 degrees and more preferably less than 3 degrees.

In the present specification, "(meth)acrylate" represents "either or both of acrylate and methacrylate."

In the present specification, the meaning of "the same" includes a case where an error range is generally allowable in the technical field. In addition, in the present specification, the meaning of "all," "entire," or "entire surface" includes not only 100% but also a case where an error range is generally allowable in the technical field, for example, 99% or more, 95% or more, or 90% or more.

In the present specification, "sense" used regarding circularly polarized light represents whether the circularly polarized light is either right circularly polarized light or left circularly polarized light. In a case where light is observed such that the light propagates toward the front side, the sense of circularly polarized light is defined as follows: in a case where a distal end of an electric field vector rotates clockwise along with an increase in time, the light is right circularly polarized light; and in a case where a distal end of an electric field vector rotates counterclockwise along with an increase in time, the light is left circularly polarized light.

In the present specification, the term "sense" can also be used regarding a helical twisted direction of cholesteric liquid crystal. In a case where a helical twisted direction (sense) of the cholesteric liquid crystal is right, right circularly polarized light is reflected and transmission of left circularly polarized light is allowed, and in a case where the sense of the cholesteric liquid crystal is left, left circularly polarized light is reflected and transmission of right circularly polarized light is allowed.

Visible light refers to light having a wavelength which can be observed by human eyes among electromagnetic waves and refers to light in a wavelength range of 380 nm to 780 nm. Invisible light refers to light in a wavelength range of shorter than 380 nm or longer than 780 nm.

In addition, although not limited thereto, in visible light, light in a wavelength range of 420 nm to 490 nm refers to blue light, light in a wavelength range of 495 nm to 570 nm refers to green light, and light in a wavelength range of 620 nm to 750 nm refers to red light. Among infrared light rays, near infrared light refers to an electromagnetic wave in a wavelength range of 780 nm to 2500 nm. Ultraviolet light refers to light in a wavelength range of 10 to 380 nm.

In the present specification, measurement of a light intensity that is required regarding calculation of a light transmittance only needs to be performed, for example, by using a typical visible spectrometer and using air as a reference.

In the present specification, in a case where "reflected light" or "transmitted light" is simply used, the meaning thereof includes scattered light and diffracted light.

In the present invention, integral reflectivity refers to a value that is measured to include specularly reflected light using a device in which a large integrating sphere device (ILV-471, manufactured by JASCO Corporation) is attached to a spectrophotometer (V-550, manufactured by JASCO Corporation) without using optical trap such that light is incident from a visible side surface of an object (member) as a target.

In addition, a selective reflection wavelength is obtained as follows. In a case where a reflection spectrum of a reflecting region is measured using the above-described method, a waveform of a characteristic reflectivity having a peak shape (upward protrusion shape) in which the horizontal axis represents a wavelength is obtained. In this case, an average reflectivity (arithmetic mean) of a maximum value and a minimum value of the characteristic reflectivity is obtained. Among two wavelengths at two intersections between the waveform and the average reflectivity, in a case where a value of a wavelength on a short wavelength side is represented by $\lambda A$ (nm) and a value of a wavelength on a long wavelength side is represented by $\lambda B$ (nm), the selective reflection wavelength is calculated from the following expression.

Peak wavelength of characteristic reflection=$(\lambda A+\lambda B)/2$

In addition, selective reflection wavelengths of a plurality of objects being "equal" does not represent that the selective reflection wavelengths are exactly equal, and error is allowed in a range where there are no optical effects. Specifically, selective reflection wavelengths of a plurality of objects being "equal" represents a difference between the selective reflection wavelengths of the respective objects is 20 nm or less, and this difference is preferably 15 nm or less and more preferably 10 nm or less.

A polarization state of light at each wavelength can be measured using a spectral radiance meter or a spectrometer on which a circular polarization plate is mounted. In this case, an intensity of light measured through a right circular polarization plate corresponds to $I_R$, and an intensity of light measured through a left circular polarization plate corresponds to $I_L$. In addition, the measurement can be performed even in a case where a circular polarization plate is attached to an illuminance meter or a spectrometer. A ratio can be measured by attaching a right circularly polarized light transmission plate to measure the amount of right circularly polarized light and attaching a left circularly polarized light transmission plate to measure the amount of left circularly polarized light.

In the present specification, p polarized light refers to polarized light that vibrates in a direction parallel to an incident surface of light. The incident surface refers to a surface that is perpendicular to a reflecting surface (for example, a laminated glass surface) and includes an incidence ray and a reflected ray. Regarding the p polarized light, a vibration surface of an electric field vector is parallel to the incident surface. In the present specification, s polarized light refers to polarized light that vibrates in a direction perpendicular to an incident surface of light.

In the present specification, Re(550) refers to an in-plane retardation (nm) at a wavelength of 550 nm, and Rth(550) refers to a thickness-direction retardation (nm) at a wavelength of 550 nm. In a method of measuring Re(550) and Rth(550), a retardation measuring device such as KOBRA 21ADH or WR (manufactured by Oji Scientific Instruments Co., Ltd.) or AXOSCAN (manufactured by Axometrics, Inc.) can be used. The measurement wavelength refers to 550 nm unless specified otherwise.

Reflective Screen

A reflective screen according to an embodiment of the present invention is a reflective screen that reflects video light projected from a projector to display a video and has transparency, the reflective screen comprising:

a light reflecting layer where a central wavelength of selective reflection at a polar angle of 60° is present in a visible range, in which at least one layer of the light reflecting layer is formed of a layer having a cholesteric liquid crystal structure, senses of helix of all of layers having a cholesteric liquid crystal structure are the same, and Expression (1) is satisfied; and a transparent first electrode, a transparent second electrode, and a light control layer that are provided on a rear side with respect to the light reflective layer in a thickness direction of the reflective screen, the second electrode being disposed to face the first electrode, and the light control layer being disposed between the first electrode and the second electrode, in which the light control layer includes a polymer network and liquid crystal molecules and changes between a first state where light is scattered and a second state where transmission of light is allowed by changing a magnitude of a voltage applied to the light control layer through the first electrode and the second electrode, the polymer network having a three-dimensional net shape having a plurality of domains, and the liquid crystal molecules being positioned in the domains.

$$R[-60,40](550)/R[-60,30](550) \geq 1.5 \qquad \text{Expression (1)}$$

Here, R[−60,40](550) represents a reflectivity at a wavelength of 550 nm with respect to incidence light incident into the reflective screen at a polar angle of −60° that is measured at a light receiving angle having a polar angle of 40° with respect to an azimuthal angle shifted by 180° from an azimuthal angle of the incidence light, and R[−60,30](550) represents a reflectivity at a wavelength of 550 nm with respect to incidence light incident into the reflective screen at a polar angle of −60° that is measured at a light receiving angle having a polar angle of 30° with respect to an azimuthal angle shifted by 180° from an azimuthal angle of the incidence light.

FIG. 1A is a conceptual diagram showing one example of the reflective screen according to the embodiment of the present invention.

A reflective screen 10 shown in FIG. 1A includes a light reflecting layer 1, an alignment layer 2, a pressure-sensitive adhesive layer 30, and a light controller 20 in this order.

Figure 1B:
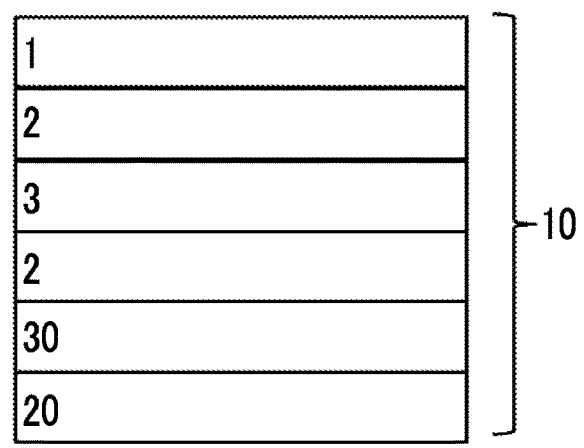
FIG. 1B is a diagram conceptually showing another example of the reflective screen according to the present invention.

FIG. 1B is a conceptual diagram showing another example of the reflective screen according to the embodiment of the present invention.

In a preferable aspect, the reflective screen 10 shown in FIG. 1B is an example including a retardation layer and includes the light reflecting layer 1, the alignment layer 2, a retardation layer 3, the alignment layer 2, the pressure-sensitive adhesive layer 30, and the light controller 20 in this order.

The light reflecting layer 1 consists of a cholesteric liquid crystal layer that is formed in a layer shape (sheet shape), in which a central wavelength of selective reflection by the cholesteric liquid crystal layer at a polar angle of 60° is present in a visible range. In a case where the light reflecting layer 1 includes a plurality of cholesteric liquid crystal layers, senses of helix of all of the cholesteric liquid crystal layers are the same.

In addition, the light reflecting layer 1 satisfies Expression (1).

$$R[-60,40](550)/R[-60,30](550) \geq 1.5 \quad \text{Expression (1)}$$

Here, R[−60,40](550) represents a reflectivity at a wavelength of 550 nm with respect to incidence light incident into the reflective screen at a polar angle of −60° that is measured at a light receiving angle having a polar angle of 40° with respect to an azimuthal angle shifted by 180° from an azimuthal angle of the incidence light, and R[−60,30](550) represents a reflectivity at a wavelength of 550 nm with respect to incidence light incident into the reflective screen at a polar angle of −60° that is measured at a light receiving angle having a polar angle of 30° with respect to an azimuthal angle shifted by 180° from an azimuthal angle of the incidence light.

The light reflecting layer 1 will be described below in detail.

The alignment layer 2 is an alignment layer for aligning the cholesteric liquid crystal layer for forming the light reflecting layer 1 to a desired alignment state. The alignment layer 2 is not particularly limited, and a well-known alignment film for aligning a cholesteric liquid crystal layer can be appropriately used.

In addition, in FIG. 1B, the alignment layer 2 between the pressure-sensitive adhesive layer 30 and the retardation layer 3 is an alignment layer for aligning the retardation layer 3 to a desired alignment state.

The light controller 20 can adjust a light transmittance by switching between a first state where light is scattered and a second state where transmission of light is allowed. The light controller 20 is disposed on a rear side with respect to the light reflecting layer 1 in the reflective screen.

The light controller 20 includes: a transparent first electrode; a transparent second electrode that is disposed to face the first electrode; and a light control layer that is disposed between the first electrode and the second electrode. The light control layer includes a polymer network that has a three-dimensional net shape having a plurality of domains and liquid crystal molecules that are positioned in the domains.

The light controller 20 can change between the first state where light is scattered and the second state where transmission of light is allowed by changing a magnitude of a voltage applied to the light control layer through the first electrode and the second electrode. In the light controller 20 including the above-described light control layer, in a case where a voltage is low or is not applied, a transmittance of light increases.

The light controller will be described below in detail.

The pressure-sensitive adhesive layer 30 is a layer for bonding the light reflecting layer 1 and the light controller 20 to each other directly or indirectly. The pressure-sensitive adhesive layer 30 is not particularly limited as long as it has a small influence on optical characteristics of the reflective screen, and a well-known pressure sensitive adhesive or adhesive that is used in various optical films can be appropriately used.

The retardation layer 3 changes a polarization state of light incident into the reflective screen.

The retardation layer 3 is combined with the cholesteric liquid crystal layer (light reflecting layer 1) such that effects such as brightness improvement or antireflection of video projected to the reflective screen can be obtained.

The retardation layer 3 will be described below in detail.

In the reflective screen having the above-described configuration, a transmittance of light from a rear surface can be changed by changing a magnitude of a voltage applied to the light controller 20. Specifically, for example, in a case where a video is not projected from a video source or in a case where a scenery is dark during projection of a video from a video source, by reducing the voltage applied to the light controller 20 or not applying a voltage to the light controller 20 such that the transparency of the light controller 20 increases, the visibility of the scenery can be improved. On the other hand, in a case where a scenery is bright during projection of a video from a video source, by increasing the voltage applied to the light controller 20 such that the transmittance of light from a rear surface (scenery) decreases, the visibility of the projected video can be improved.

Here, in the reflective screen according to the embodiment of the present invention, the light reflecting layer that reflects light projected from a video source includes a cholesteric liquid crystal layer that reflects one circularly polarized light at a selective reflection wavelength, and the light control layer includes a polymer network that has a three-dimensional net shape having a plurality of domains and liquid crystal molecules that are positioned in the domains. By using the cholesteric liquid crystal layer as the light reflecting layer, light having a wavelength projected from a video source can be selectively reflected. Therefore, the reflectivity of light having a wavelength as a video can be increased while increasing the light transmittance in the entire visible range, and high light transmittance and video visibility can be improved at the same time. In addition, the light control layer having the above-described configuration adjusts the transmittance of light by controlling the arrangement of the liquid crystal molecules using a difference in refractive index in an axis direction of the liquid crystal molecules. Therefore, in a state where transmission of light is allowed, absorption of light or the like is not likely to occur. Therefore, in a state where transmission of light is allowed, the transmittance of light can be improved, and high light transmittance can be obtained.

In addition, in a case where the light reflecting layer includes a plurality of cholesteric liquid crystal layers, senses of helix of all of the cholesteric liquid crystal layers are the same. As a result, in particular, in a case where a light source is, for example, a laser light source having a polarization property, there is an advantageous effect from the viewpoint of improving reflectivity and transparency at the same time.

In addition, by the light reflecting layer satisfying Expression (1), a bright reflected image can be obtained at a wide viewing angle, and visibility can be improved.

Here, in the reflective screen according to the embodiment of the present invention, it is preferable that a maximum reflectivity of integral reflectivity at a wavelength of 620 to 680 nm is 15% to 28%. As a result, in the first state where transmission of light is not allowed, the visibility of a projection image can be improved.

In addition, it is preferable that a transmittance of the reflective screen in a state where a transmittance of the light control layer is the highest is 51% or more and 85% or less. As a result, in the second state where transmission of light is allowed, the visibility of a scenery can be improved.

In addition, it is preferable that the light control layer according to the embodiment of the present invention is bonded to a transparent support through a pressure-sensitive adhesive layer, the transparent support supporting the light reflective layer.

Figure 4:
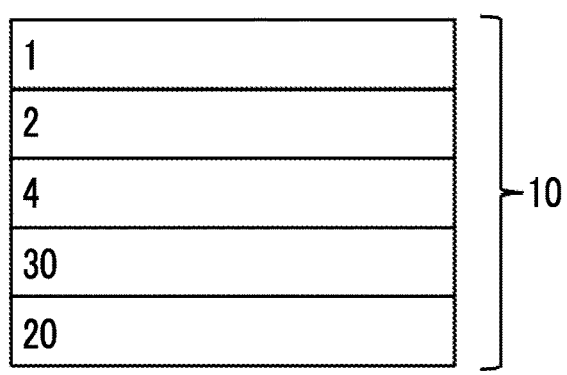
FIG. 4 is a diagram conceptually showing still another example of the reflective screen according to the present invention.

FIG. 4 is a conceptual diagram showing another example of the reflective screen according to the embodiment of the present invention.

A reflective screen shown in FIG. 4 includes the light reflecting layer 1, the alignment layer 2, a transparent support 4, the pressure-sensitive adhesive layer 30, and the light controller 20 in this order.

The transparent support 4 supports the light reflecting layer 1 and the alignment layer 2, and functions as a support for forming the light reflecting layer 1.

In the example shown in FIG. 4, the light controller 20 (light control layer) is bonded to a surface of the transparent support 4 opposite to the light reflecting layer 1 through the pressure-sensitive adhesive layer 30.

As the transparent support 4, a well-known support in the related art that is used as a support of a cholesteric liquid crystal layer can be appropriately used. For example, the same support as the transparent substrate described below can be used.

Figure 2:
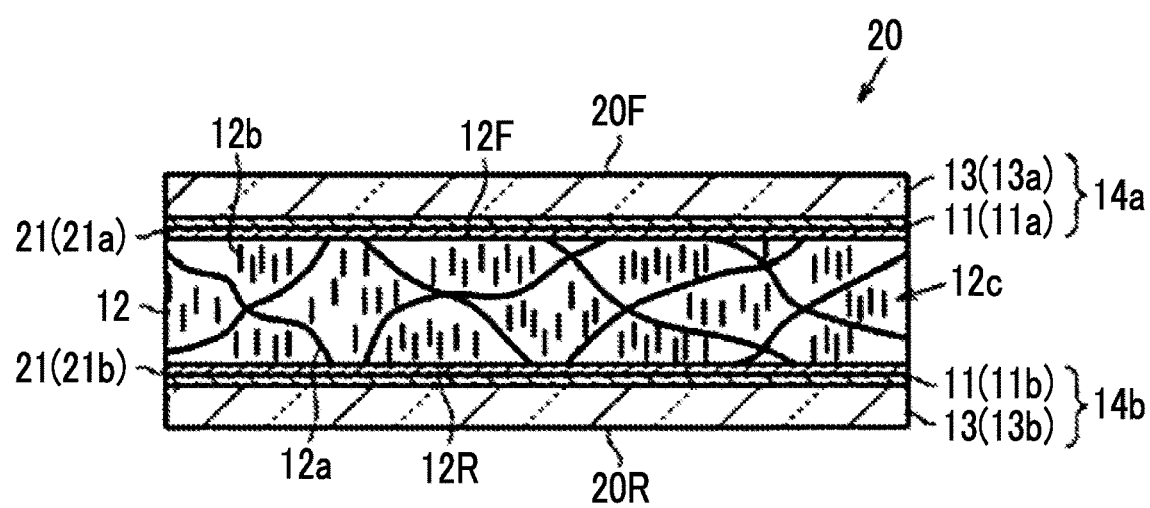
FIG. 2 is a diagram conceptually showing one example of a light control layer configuration in the reflective screen according to the present invention.

In the present invention, as shown in FIGS. 1 and 2, The light reflecting layer 1 and the alignment layer 2 may be peeled off from the transparent support 4 to be bonded to the light controller 20. Alternatively, the transparent support 4 and the alignment layer 2 may be peeled off from the light reflecting layer 1 such that the light reflecting layer 1 alone is bonded to the light controller 20.

Hereinafter, the components of the reflective screen according to the embodiment of the present invention will be described in detail.

Layer Having Cholesteric Liquid Crystal Structure

The reflective screen may include one or two or more layers having a cholesteric liquid crystal structure (cholesteric liquid crystal layer) as the light reflecting layer. Another layer such as an alignment layer or an adhesive layer may be provided between two or more layers having a cholesteric liquid crystal structure. In addition, another layer such as an underlayer or a transparent layer may be provided between the layer having a cholesteric liquid crystal structure and the retardation layer.

In addition, the layer having a cholesteric liquid crystal structure may be a cholesteric liquid crystal layer where a layer having a cholesteric liquid crystal structure is formed in a layer shape or may be a layer where a plurality of substantially hemispherical dots having a cholesteric liquid crystal structure are arranged. In the following description, it is assumed that the layer having a cholesteric liquid crystal structure is a layered cholesteric liquid crystal layer.

(Cholesteric Liquid Crystal Structure)

The cholesteric liquid crystal structure only needs to be a structure in which the alignment of a liquid crystal compound as a cholesteric liquid crystalline phase is immobilized. Typically, the cholesteric liquid crystal structure only needs to be a structure in a state where a polymerizable liquid crystal compound is aligned to an alignment state of a cholesteric liquid crystalline phase and is polymerized and cured by ultraviolet irradiation, heating, or the like such that there is no fluidity and where the alignment state is not changed by an external field or an external force. The cholesteric liquid crystal structure is not particularly limited as long as the optical characteristics of the cholesteric liquid crystalline phase are maintained, and the liquid crystal compound does not need to exhibit liquid crystallinity. For example, the molecular weight of the polymerizable liquid crystal compound may be increased by a curing reaction such that the liquid crystallinity thereof is lost.

It is known that the cholesteric liquid crystalline phase has circularly polarized light selective reflection where, among right circularly polarized light or left circularly polarized light, circularly polarized light having any one sense is selectively reflected and transmission of circularly polarized light having another sense is allowed. In the present specification, the circularly polarized light selective reflection will also be simply referred to as selective reflection.

As a film including a layer where a cholesteric liquid crystalline phase having circularly polarized light selective reflectivity is immobilized, many films formed of a composition including a polymerizable liquid crystal compound are known. The cholesteric liquid crystal structure or the cholesteric liquid crystal layer can refer to these techniques in the related art.

A central wavelength $\lambda$ of selective reflection of the cholesteric liquid crystal structure depends on a pitch P (=helical period) of a helical structure in the cholesteric phase and satisfies a relationship of $\lambda = n \times P$ with an average refractive index n of the cholesteric liquid crystal structure. In the present specification, the central wavelength $\lambda$ of selective reflection of the cholesteric liquid crystal structure refers to a wavelength at a centroid position of the reflection peak in the circular polarization reflection spectrum measured from the normal direction of the cholesteric liquid crystal layer.

As can be seen from the relationship $\lambda = n \times P$, the central wavelength of the selective reflection can be adjusted by adjusting the pitch of the helical structure. It is preferable that the cholesteric liquid crystal layer having selective reflection in a visible range has a central wavelength of selective reflection in a visible range. For example, in order to selectively reflect right circularly polarized light or left circularly polarized light with respect to red light, green light, or blue light, the central wavelength $\lambda$ can be adjusted by adjusting the n value and the P value.

In the reflective screen according to the embodiment of the present invention, clear double images do not occur unlike an aspect where a virtual image is used, but light reflected from a front surface or a rear surface is incident again into the reflective screen such that diffuse-reflection occurs. As a result, image blur occurs, and clearness deteriorates. Therefore, in an aspect where the reflective screen is bonded to a glass plate and used as in a head-up display system, in order to reduce image blur caused by projection light being reflected from a front surface or a rear surface of the glass plate, it is preferable that the glass plate is used such that light is obliquely incident into the layer having a cholesteric liquid crystal structure. In addition, this way, in a case where light is obliquely incident, the central wavelength of the selective reflection is shifted to a shorter wavelength side. Therefore, regarding the wavelength of the selective reflection required for projection image display, it is preferable that n×P is adjusted such that λ calculated from the expression λ=n×P is on a longer wavelength side. In a case where light passes through a layer having a cholesteric liquid crystal structure having a refractive index $n_2$ at an angle of $\theta_2$ with respect to a normal direction of the layer having a cholesteric liquid crystal structure (helical axis direction of the cholesteric liquid crystal layer), a central wavelength of selective reflection is represented by $\lambda_d$, and $\lambda_d$ is represented by the following expression.

$$\lambda_d = n_2 \times P \times \cos\theta_2$$

For example, in a case where the reflective screen includes the cholesteric liquid crystal layer as the layer having a cholesteric liquid crystal structure and a retardation layer A having a λ/2 retardation, light incident from the retardation layer A having a λ/2 retardation at an angle of 45° to 70° with respect to a normal line of a projection image display portion (portion where light from the reflective screen is incident) in the air having a refractive index of 1 typically passes through the λ/2 retardation layer having a refractive index of about 1.45 to 1.80 at an angle of 23° to 40° with respect to the normal line of the projection image display portion and is incident into the cholesteric liquid crystal layer having a refractive index of about 1.61. Since the light transmits through the cholesteric liquid crystal layer at an angle of 26° to 36°, a central wavelength of selective reflection obtained from this angle may be substituted into the above-described expression to adjust n×P.

The pitch of the cholesteric liquid crystalline phase depends on the kind of the chiral agent which is used in combination of the polymerizable liquid crystal compound, or the concentration of the chiral agent added. Therefore, a desired pitch can be obtained by adjusting the kind and concentration of the chiral agent. As a method of measuring a sense of helix or pitch, a method described in "Introduction to Experimental Liquid Crystal Chemistry," (the Japanese Liquid Crystal Society, 2007, Sigma Publishing Co., Ltd.), p. 46, and "Liquid Crystal Handbook" (the Editing Committee of Liquid Crystal Handbook, Maruzen Publishing Co., Ltd.), p. 196 can be used.

By adjusting the central wavelength of the selective reflection of the layer having a cholesteric liquid crystal structure to be used depending on a luminescence wavelength range of a light source used for projection and a use aspect of the layer having a cholesteric liquid crystal structure, a clear projection image can be displayed with a high light utilization efficiency. In particular, by adjusting the central wavelength of the selective reflection of each of the cholesteric liquid crystal structures depending on the luminescence wavelength range of the light source used for projection and the like, a clear color projection image can be displayed with a high light utilization efficiency. Examples of the use aspect of the layer having a cholesteric liquid crystal structure include an incidence angle of projection light into the layer having a cholesteric liquid crystal structure and a direction in which a projection image is observed.

As the cholesteric liquid crystal structure, a cholesteric liquid crystal layer in which the sense of helix is either right or left is used. The sense of reflected circularly polarized light of the cholesteric liquid crystal structure matches with the sense of helix. All of the senses of helix of the cholesteric liquid crystal structures having different central wavelengths of selective reflection may be the same as or different from each other and are preferably the same as each other.

In addition, a half-width Δλ (nm) of a selective reflection bandwidth where selective reflection is exhibited depends on a birefringence Δn of the liquid crystal compound and the pitch P and satisfies a relationship of Δλ=Δn×P. Therefore, the selective reflection bandwidth can be controlled by adjusting Δn. Δn can be adjusted by adjusting the kind of the polymerizable liquid crystal compound and a mixing ratio thereof, or by controlling a temperature during alignment immobilization.

The half-width Δλ of selective reflection may be, for example, 15 nm to 200 nm, 15 nm to 150 nm, or 20 nm to 100 nm.

It is preferable that, in the cholesteric liquid crystal layer used in the present invention, the liquid crystal compound is immobilized in a cholesteric alignment state. The cholesteric alignment state may be an alignment state where right circularly polarized light is reflected, an alignment state where left circularly polarized light is reflected, or an alignment state where right circularly polarized light and left circularly polarized light are reflected. The liquid crystal compound used in the present invention is not particularly limited, and various well-known liquid crystal compounds can be used.

In addition, in a case where a cross-section of the cholesteric liquid crystal layer used in the present invention is observed using a scanning electron microscope (SEM), it is preferable that the cross-section has a stripe pattern including bright portions and dark portions.

It is preferable that the stripe pattern has a waving structure, and it is preferable that an average value of peak-to-peak distances of the waving structure is 0.5 μm to 50 μm. The average value of peak-to-peak distances of the waving structure is more preferably 1.5 μm to 30 μm and still more preferably 2.5 μm to 20 μm.

In the present invention, the waving structure refers to a structure in which at least one region M where an absolute value of an inclined angle of a continuous line of the bright portions or the dark portions in the stripe pattern with respect to a plane of the cholesteric liquid crystal layer is 5° or more is present, and peaks or valleys having an inclined angle of 0° are specified at two points most adjacent to each other with the region M interposed between the two points.

the peaks or the valleys having an inclined angle of 0° have a protrusion shape or a recessed shape. However, the peaks or the valleys may be points having a stepwise shape or a rack shape as long as it has an inclined angle of 0°. In the waving structure, it is preferable that the region M in which an absolute value of an inclined angle of a continuous line of the bright portions or the dark portions in the stripe pattern is 5° or more and the peaks or the valleys with the region M interposed therebetween are repeated multiple times.

In addition, the peak-to-peak distance of the waving structure refers to a value obtained by measuring the distance in a plane direction of the cholesteric liquid crystal layer between the peaks or the valleys having an inclined angle of 0° at the two points most adjacent to each other with the region M interposed therebetween and obtaining the average of distance values at all the thicknesses in a case where the length of the cholesteric liquid crystal layer in a major axis direction of the cross-section is 100 μm.

Here, in a case where each of continuous lines is in contact with any one of interfaces of a film and is interrupted, opposite ends of the interrupted portion are not considered as a peak or a valley. In addition, in a case where each of continuous lines has a bent structure, the continuous line is considered to be interrupted, and opposite ends of the interrupted portion are not considered as a peak or a valley.
(Method of Forming Cholesteric Liquid Crystal Structure)

Hereinafter, a material and a method for forming the cholesteric liquid crystal structure will be described.

Examples of the material for forming the cholesteric liquid crystal structure include a liquid crystal composition including a polymerizable liquid crystal compound and a chiral agent (optically active compound). The liquid crystal composition in which optionally a surfactant, a polymerization initiator, and the like are further mixed and dissolved in a solvent or the like is applied or jetted to the retardation layer, the underlayer, the cholesteric liquid crystal layer, or the like as an underlayer and are cholesterically aligned and aged, and the liquid crystal composition is cured to immobilize the alignment state. As a result, the cholesteric liquid crystal structure can be formed. The cholesteric liquid crystal layer can be formed by the application, and the layer including a plurality of cholesteric liquid crystal dots can be formed by the jetting.
(Polymerizable Liquid Crystal Compound)

The polymerizable liquid crystal compound may be a rod-like liquid crystal compound or a disk-like liquid crystal compound and is preferably a rod-like liquid crystal compound.

Examples of the rod-like polymerizable liquid crystal compound for forming the cholesteric liquid crystal structure include a rod-like nematic liquid crystal compound. As the rod-like nematic liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. Not only a low-molecular-weight liquid crystal compound but also a polymer liquid crystal compound can be used.

The polymerizable liquid crystal compound can be obtained by introducing a polymerizable group into the liquid crystal compound. Examples of the polymerizable group include an unsaturated polymerizable group, an epoxy group, and an aziridinyl group. Among these, an unsaturated polymerizable group is preferable, and an ethylenically unsaturated polymerizable group is more preferable. The polymerizable group can be introduced into the molecules of the liquid crystal compound using various methods. The number of polymerizable groups in the polymerizable liquid crystal compound is preferably 1 to 6 and more preferably 1 to 3 in one molecule. Examples of the polymerizable liquid crystal compound include compounds described in Makromol. Chem. (1989), Vol. 190, p. 2255, Advanced Materials (1993), Vol. 5, p. 107, U.S. Pat. Nos. 4,683,327A, 5,622,648A, and 5,770,107A, WO95/22586A, WO95/24455A, WO97/00600A, WO98/23580A, WO98/52905A, JP1989-272551A (JP-H1-272551A), JP1994-16616A (JP-H6-16616A), JP1995-110469A (JP-H7-110469A), JP1999-80081A (JP-H11-80081A), JP2001-328973A, WO2016/194327A, and WO2016/052367A. Two or more polymerizable liquid crystal compounds may be used in combination. In a case where two or more polymerizable liquid crystal compounds are used in combination, there may be a case where the alignment temperature can be decreased.

In addition, the addition amount of the polymerizable liquid crystal compound in the liquid crystal composition is preferably 80% to 99.9 mass %, more preferably 85% to 99.5 mass %, and still more preferably 90% to 99 mass % with respect to the solid content mass (mass excluding a solvent) of the liquid crystal composition.
(Chiral Agent: Optically Active Compound)

The chiral agent has a function of causing a helical structure of a cholesteric liquid crystalline phase to be formed. The chiral compound may be selected depending on the purpose because a sense of helix or a helical pitch induced from the compound varies.

The chiral agent is not particularly limited, and a well-known compound can be used. Examples of the chiral agent include compounds described in Liquid Crystal Device Handbook (No. 142 Committee of Japan Society for the Promotion of Science, 1989), Chapter 3, Article 4-3, chiral agent for TN or STN, p. 199), JP2003-287623A, JP2002-302487A, JP2002-80478A, JP2002-80851A, JP2010-181852A, and JP2014-034581A.

In general, the chiral agent includes an asymmetric carbon atom. However, an axially asymmetric compound or a planar asymmetric compound not having an asymmetric carbon atom can be used as the chiral agent. Examples of the axially asymmetric compound or the planar asymmetric compound include binaphthyl, helicene, paracyclophane, and derivatives thereof. The chiral agent may include a polymerizable group. In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this aspect, it is preferable that the polymerizable group included in the polymerizable chiral agent is the same as the polymerizable group included in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

As the chiral agent, an isosorbide derivative, an isomannide derivative, or a binaphthyl derivative can be preferably used. As the isosorbide derivative, a commercially available product such as LC-756 (manufactured by BASF SE) may be used.

The content of the chiral agent in the liquid crystal composition is preferably 0.01 mol % to 200 mol % and more preferably 1 mol % to 30 mol % with respect to the amount of the polymerizable liquid crystal compound.
(Polymerization Initiator)

It is preferable that the liquid crystal composition includes a polymerization initiator. In a configuration where a polymerization reaction progresses with ultraviolet irradiation, it is preferable that the polymerization initiator is a photopolymerization initiator which initiates a polymerization reaction with ultraviolet irradiation. Examples of the photopolymerization initiator include an α-carbonyl compound (described in U.S. Pat. Nos. 2,367,661A and 2,367,670A), an acyloin ether (described in U.S. Pat. No. 2,448,828A), an α-hydrocarbon-substituted aromatic acyloin compound (described in U.S. Pat. No. 2,722,512A), a polynuclear quinone compound (described in U.S. Pat. Nos. 3,046,127A and 2,951,758A), a combination of a triarylimidazole dimer and p-aminophenyl ketone (described in U.S. Pat. No. 3,549,367A), an acridine compound and a phenazine compound (described in JP1985-105667A (JP-S60-105667A) and U.S. Pat. No. 4,239,850A), an acylphosphine oxide compound (described in JP1988-40799B (JP-S63 -40799B), JP1993-29234B (JP-H5-29234B), JP1998-95788A (JP-H10-95788A), JP1998-29997A (JP-H10-29997A), JP2001-233842A, JP2000-80068A, JP2006-342166A, JP2013 -114249A, JP2014-137466A, JP4223071B, JP2010-262028A, and JP2014-500852A), an oxime compound (described in JP2000-66385A and JP4454067B), and an oxadiazole compound (described in U.S. Pat. No. 4,212,970A). For example, the description of paragraphs "0500" to "0547" of JP2012-208494A can also be referred to.

As the polymerization initiator, an acylphosphine oxide compound or an oxime compound is also preferably used.

As the acylphosphine oxide compound, for example, IRGACURE 810 (manufactured by BASF Japan Ltd. compound name: bis(2,4,6-trimethylbenzoyl)-phenylphosphine oxide) as a commercially available product can be used. As the oxime compound, for example, a commercially available product such as IRGACURE OXE01 (manufactured by BASF SE), IRGACURE OXE02 (manufactured by BASF SE), TR-PBG-304 (manufactured by Changzhou Tronly New Electronic Materials Co., Ltd.), ADEKA ARKLS NCI-831, ADEKA ARKLS NCI-930 (manufactured by Adeka Corporation), ADEKA ARKLS NCI-831 (manufactured by Adeka Corporation) can be used.

As the polymerization initiator, one kind may be used alone, or two or more kinds may be used in combination.

The content of the photopolymerization initiator in the liquid crystal composition is preferably 0.1 mass % to 20 mass % and more preferably 0.5 mass % to 5 mass % with respect to the content of the polymerizable liquid crystal compound.

(Crosslinking Agent)

In order to improve the film hardness after curing and to improve durability, the liquid crystal composition may optionally include a crosslinking agent. As the crosslinking agent, a curing agent which can perform curing with ultraviolet light, heat, moisture, or the like can be suitably used.

The crosslinking agent is not particularly limited and can be appropriately selected depending on the purpose. Examples of the crosslinking agent include: a polyfunctional acrylate compound such as trimethylol propane tri(meth) acrylate or pentaerythritol tri(meth)acrylate; an epoxy compound such as glycidyl (meth)acrylate or ethylene glycol diglycidyl ether; an aziridine compound such as 2,2-bis hydroxymethyl butanol-tris[3 -(1-aziridinyl)propionate] or 4,4-bis(ethyleneiminocarbonylamino)diphenylmethane; an isocyanate compound such as hexamethylene diisocyanate or a biuret type isocyanate; a polyoxazoline compound having an oxazoline group at a side chain thereof; and an alkoxysilane compound such as vinyl trimethoxysilane or N-(2-aminoethyl)-3-aminopropyltrimethoxysilane. In addition, depending on the reactivity of the crosslinking agent, a well-known catalyst can be used, and not only film hardness and durability but also productivity can be improved. As the crosslinking agent, one kind may be used alone, or two or more kinds may be used in combination.

The content of the crosslinking agent is preferably 3 mass % to 20 mass % and more preferably 5 mass % to 15 mass %. By adjusting the content of the crosslinking agent to be 3 mass % or more, the effect of improving the crosslinking density can be obtained. By adjusting the content of the crosslinking agent to be 20 mass % or less, a decrease in the stability of the cholesteric liquid crystal structure can be prevented.

(Alignment Control Agent)

An alignment control agent contributing to the stable or rapid formation of a cholesteric liquid crystal structure with planar alignment may be added to the liquid crystal composition. Examples of the alignment control agent include fluorine (meth)acrylate polymers described in paragraphs "0018" to "0043" of JP2007-272185A, and compounds represented by Formulae (I) to (IV) described in paragraphs "0031" to "0034" of JP2012-203237A.

As an alignment control agent, one kind may be used alone, or two or more kinds may be used in combination.

The addition amount of the alignment control agent in the liquid crystal composition is preferably 0.01 mass % to 10 mass %, more preferably 0.01 mass % to 5 mass %, and still more preferably 0.02 mass % to 1 mass % with respect to the total mass of the polymerizable liquid crystal compound.

(Surfactant)

The liquid crystal composition may include a surfactant. It is preferable that the surfactant is a compound which can function as an alignment control agent contributing to the stable or rapid formation of a cholesteric structure with planar alignment. Examples of the surfactant include a silicone-based surfactant and a fluorine-based surfactant. Among these, a fluorine-based surfactant is preferable.

Specific examples of the surfactant include compounds described in paragraphs "0082" to "0090" of JP2014-119605A, compounds described in paragraphs "0031" to "0034" of JP2012-203237A, exemplary compounds described in paragraphs "0092" and "0093" of JP2005-99248A, exemplary compounds described in paragraphs "0076" to "0078" and "0082" to "0085" of JP2002-129162A, and fluorine (meth)acrylate polymers described in paragraphs "0018" to "0043" of JP2007-272185A.

As a horizontal alignment agent, one kind may be used alone, or two or more kinds may be used in combination.

As the fluorine-based surfactant, a compound represented by Formula (I) described in paragraphs "0082" to "0090" of JP2014-119605A is more preferable.

Formula (1)

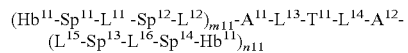

In Formula (I), $L^{11}$, $L^{12}$, $L^{13}$, $L^{14}$, $L^{15}$, and $L^{16}$ each independently represent a single bond, —O—, —S—, —CO—, —COO—, —OCO—, —COS—, —SCO—, —NRCO—, or —CONR—(in Formula (I), R represents a hydrogen atom or an alkyl group having 1 to 6 carbon atoms). —NRCO—or —CONR—has an effect of reducing solubility and is likely to increase haze during the preparation of dots. Therefore, —O—, —S—, —CO—, —COO—, —OCO—, —COS—or —SCO—is preferable, and from the viewpoint of the stability of the compound, —O—, —CO—, —COO—, or —OCO— is more preferable. An alkyl group represented by R may be linear or branched. An alkyl group having 1 to 3 carbon atoms is more preferable, and examples thereof include a methyl group, an ethyl group, and an n-propyl group.

$Sp^{11}$, $Sp^{12}$, $Sp^{13}$, and $Sp^{14}$ each independently represent a single bond or an alkylene group having 1 to 10 carbon atoms, more preferably a single bond or an alkylene group having 1 to 7 carbon atoms, and still more preferably a single bond or an alkylene group having 1 to 4 carbon atoms. However, a hydrogen atom in the alkylene group may be substituted with a fluorine atom. The alkylene group may have a branch or not, and a linear alkylene group having no branch is preferable. From the viewpoint of synthesis, it is preferable that $Sp^{11}$ and $Sp^{14}$ are the same and $Sp^{12}$ and $Sp^{13}$ are the same.

$A^{11}$ and $A^{12}$ represent a monovalent to tetravalent aromatic hydrocarbon group. The number of carbon atoms in the aromatic hydrocarbon group is preferably 6 to 22, more preferably 6 to 14, still more preferably 6 to 10, and still more preferably 6. The aromatic hydrocarbon group represented by $A^{11}$ and $A^{12}$ may have a substituent. Examples of the substituent include an alkyl group having 1 to 8 carbon atoms, an alkoxy group, a halogen atom, a cyano group, and an ester group. The description and preferable ranges of the groups can be found in the corresponding description of $T^{11}$ described below. Examples of a substituent with which the aromatic hydrocarbon group represented by $A^{11}$ or $A^{12}$ is substituted include a methyl group, an ethyl group, a methoxy group, an ethoxy group, a bromine atom, a chlorine atom, and a cyano group. A molecule including a large amount of a perfluoroalkyl portion can cause liquid crystal to be aligned even in a small addition amount, which leads to reduction in haze. Therefore, in order for the molecule to include many perfluoroalkyl groups, it is preferable that $A^{11}$ and $A^{12}$ are tetravalent. From the viewpoint of synthesis, it is preferable that $A^{11}$ and $A^{12}$ are the same.

It is preferable that $T^{11}$ represents a divalent group or a divalent aromatic heterocyclic group represented by any one of the following formulae (X in $T^{11}$ represents an alkyl group having 1 to 8 carbon atoms, an alkoxy group, a halogen atom, a cyano group, or an ester group, and Ya, Yb, Yc, and Yd each independently represent a hydrogen atom or an alkyl group having 1 to 4 carbon atoms).

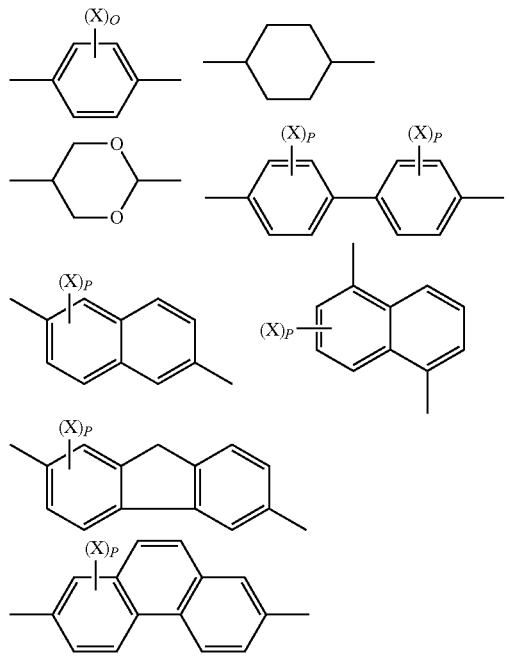

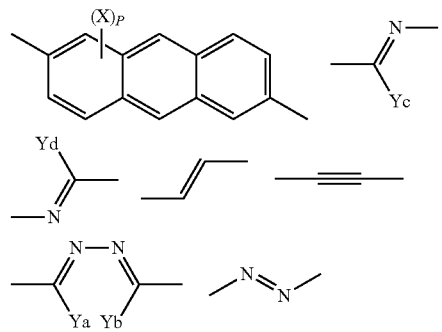

In particular, a more preferable group is as follows.

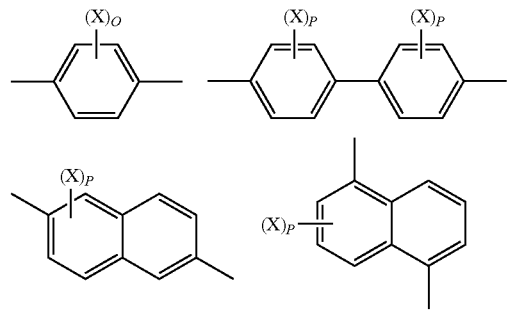

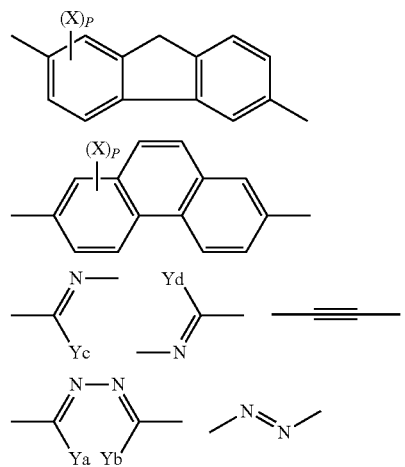

The following group is still more preferable.

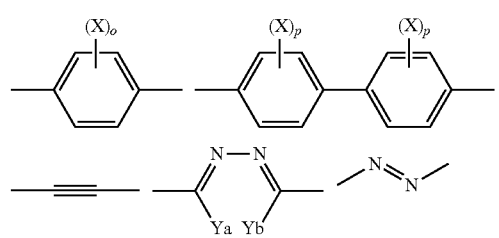

The following group is most preferable.

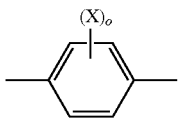

The number of carbon atoms in the alkyl group represented by X in $T^{11}$ is 1 to 8, preferably 1 to 5, and more preferably 1 to 3. The alkyl group may be linear, branched, or cyclic and is preferably linear or branched. Preferable examples of the alkyl group include a methyl group, an ethyl group, an n-propyl group, and an isopropyl group. Among these, a methyl group is preferable.

The details of an alkyl portion of the alkoxy group represented by X in $T^{11}$ can be found in the description and preferable range of the alkyl group represented by X in $T^{11}$. Examples of the halogen atom represented by X in $T^{11}$ include a fluorine atom, a chlorine atom, a bromine atom, and an iodine atom. Among these, a chlorine atom or a bromine atom is preferable. Examples of the ester group represented by X in $T^{11}$ include a group represented by $R^aCOO$—. $R^a$ represents, for example, an alkyl group having 1 to 8 carbon atoms. The description and preferable range of the alkyl group represented by $R^a$ can be found in the description and preferable range of the alkyl group represented by X in $T^{11}$. Specific examples of the ester include $CH_3COO$— and $C_2H_5COO$—. The alkyl group having 1 to 4 carbon atoms represented by Ya, Yb, Yc, and Yd may be linear or branched. Examples of the alkyl group having 1 to 4 carbon atoms include a methyl group, an ethyl group, an n-propyl group, and an isopropyl group.

It is preferable that the divalent aromatic heterocyclic group has a 5-membered, 6-membered, or 7-membered heterocycle. A 5- or 6-membered ring is more preferable, and a 6-membered ring is most preferable. As a heteroatom constituting the heterocycle, a nitrogen atom, an oxygen atom, or a sulfur atom is preferable. It is preferable that the heterocycle is an aromatic heterocycle. In general, the aromatic heterocycle is an unsaturated heterocycle. An unsaturated heterocycle having most double bonds is more preferable. Examples of the heterocycle include a furan ring, a thiophene ring, a pyrrole ring, a pyrroline ring, a pyrrolidine ring, an oxazole ring, an isoxazole ring, a thiazole ring, an isothiazole ring, an imidazole ring, an imidazoline ring, an imidazolidine ring, a pyrazole ring, a pyrazoline ring, a pyrazolidine ring, a triazole ring, a furazan ring, a tetrazole ring, a pyran ring, a thiin ring, a pyridine ring, a piperidine ring, an oxazine ring, a morpholine ring, a thiazine ring, a pyridazine ring, a pyrimidine ring, a pyrazine ring, a piperazine ring, and a triazine ring. The divalent heterocyclic group may have a substituent. The description and preferable range of the substituent can be found in the description of the substituent with which the monovalent to tetravalent aromatic hydrocarbon represented by $A^{11}$ or $A^{12}$ is substituted.

$Hb^{11}$ represents a perfluoroalkyl group having 2 to 30 carbon atoms, more preferably a perfluoroalkyl group having 3 to 20 carbon atoms, and still more preferably a perfluoroalkyl group having 3 to 10 carbon atoms. The perfluoroalkyl group may be linear, branched, or cyclic and is preferably linear or branched and more preferably linear.

m11 and n11 each independently represent 0 to 3 and m11+n11≥1. In this case, a plurality of structures in parentheses may be the same as or different from each other and is preferably the same as each other. m11 and n11 in Formula (I) are determined depending on the valences of $A^{11}$ and $A^{12}$, and preferable ranges thereof are determined depending on the preferable ranges of the valences of $A^{11}$ and $A^{12}$.

o and p in $T^{11}$ each independently represent an integer of 0 or more. In a case where o and p represent an integer of 2 or more, a plurality of X's may be the same as or different from each other. o in $T^{11}$ represents preferably 1 or 2. p in $T^{11}$ represents preferably an integer of 1 to 4 and more preferably 1 to 2.

A molecular structure of the compound represented by Formula (I) may be symmetrical or non-symmetrical. "Symmetry" described herein represents at least one of point symmetry, line symmetry, or rotational symmetry, and "non-symmetry" described herein does not represent any one of point symmetry, line symmetry, or rotational symmetry.

The compound represented by Formula (I) is a combination of the perfluoroalkyl group ($Hb^{11}$), the linking groups -($-Sp^{11}-L^{11}-Sp^{12}-L^{12}$)m11-$A^{11}-L^{13}$- and -$L^{14}-A^{12}-(L^{15}-Sp^{13}-L^{16}-Sp^{14}$)n11- described above, and preferably the divalent group having an excluded volume effect which is represented by $T^{11}$. Two perfluoroalkyl groups ($Hb^{11}$) present in the molecule are preferably the same as each other, and the linking groups -($Sp^{11}-L^{11}-Sp^{12}-L^{12}$)m11-$A^{11}-L^{13}$- and -$L^{14}-A^{12}-(L^{15}-Sp^{13}-L^{16}-Sp^{14}$)n11- present in the molecule are also preferably the same as each other. $Hb^{11}-Sp^{11}-Sp^{12}$- and -$Sp^{13}-L^{16}-Sp^{14}-Hb^{11}$ present at the terminal are preferably a group represented by any one of the following formulae:

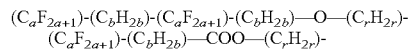

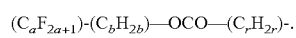

In the above formulae, a represents preferably 2 to 30, more preferably 3 to 20, and still more preferably 3 to 10. b represents preferably 0 to 20, more preferably 0 to 10, and still more preferably 0 to 5. a+b represents 3 to 30. r represents preferably 1 to 10 and more preferably 1 to 4.

In addition, $Hb^{11}-Sp^{11}-L^{11}-Sp^{12}-L^{12}$- and -$L^{15}-Sp^{13}-L^{16}-Sp^{14}-Hb^{11}$ present at the terminal of Formula (I) are preferably a group represented by any one of the following formulae:

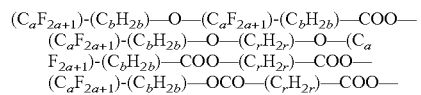

In the above formulae, a, b, and r have the same definitions as described above.

The addition amount of the surfactant in the liquid crystal composition is preferably 0.01 mass % to 10 mass %, more preferably 0.01 mass % to 5 mass %, and still more preferably 0.02 mass % to 1 mass % with respect to the total mass of the polymerizable liquid crystal compound.

(Other Additives)

In addition, the liquid crystal composition may include at least one selected from various additives such as a polymerizable monomer. In addition, optionally, a polymerization inhibitor, an antioxidant, an ultraviolet absorber, a light stabilizer, a coloring material, metal oxide fine particles or the like can be added to the liquid crystal composition in a range where optical performance does not deteriorate.

A cholesteric liquid crystal structure in which cholesteric regularity is immobilized can be formed by dissolving the polymerizable liquid crystal compound, the chiral agent, and the polymerization initiator and further the optionally added surfactant or the like in a solvent to prepare a liquid crystal composition, applying or jetting the liquid crystal composition to the retardation layer, the underlayer, the previous prepared cholesteric liquid crystal layer, or the like, drying the liquid crystal composition to obtain a coating film, and irradiating the coating film with an actinic ray for polymerization to obtain a cholesteric liquid crystal composition. A laminated film consisting of a plurality of cholesteric liquid crystal layers can be formed by repeating the above-described manufacturing steps of the cholesteric liquid crystal layer.

(Solvent)

The solvent used for preparing the liquid crystal composition is not particularly limited and can be appropriately selected depending on the purpose. An organic solvent is preferably used.

The organic solvent is not particularly limited and can be appropriately selected depending on the purpose. Examples of the organic solvent include a ketone, an alkyl halide, an amide, a sulfoxide, a heterocyclic compound, a hydrocarbon, an ester, and an ether. As the organic solvent, one kind may be used alone, or two or more kinds may be used in combination. Among these, a ketone is more preferable in consideration of an environmental burden.

(Application, Alignment, Polymerization)

A method of applying the liquid crystal composition is not particularly limited and can be appropriately selected depending on the purpose. Examples of the method of applying the liquid crystal composition include a wire bar coating method, a curtain coating method, an extrusion coating method, a direct gravure coating method, a reverse gravure coating method, a die coating method, a spin coating method, a dip coating method, a spray coating method, and a slide coating method. In addition, the application can also be realized by transferring the liquid crystal composition that is separately applied to the support. In addition, the liquid crystal composition can also be jetted. As the jetting method, an ink jet method can be used.

By heating the applied or jetted liquid crystal composition, liquid crystal molecules are aligned. The heating temperature is preferably 200° C. or lower and more preferably 130° C. or lower. Due to the alignment treatment, a structure in which the polymerizable liquid crystal compound is twisted to have a helical axis in a direction substantially perpendicular to the film surface can be obtained.

By further polymerizing the aligned liquid crystal compound, the liquid crystal composition can be cured. Regarding the polymerization, thermal polymerization or photopolymerization using light irradiation may be performed, and photopolymerization is preferable. Regarding the light irradiation, ultraviolet light is preferably used. The irradiation energy is preferably 20 mJ/cm$^2$ to 50 J/cm$^2$ and more preferably 100 mJ/cm$^2$ to 1500 mJ/cm$^2$. In order to promote a photopolymerization reaction, light irradiation may be performed under heating conditions or in a nitrogen atmosphere. The wavelength of irradiated ultraviolet light is preferably 350 nm to 430 nm. From the viewpoint of stability, the polymerization degree is preferably high, and is preferably 70% or more and more preferably 80% or more. The polymerization degree can be determined by measuring a consumption ratio between polymerizable functional groups using an IR absorption spectrum.

Cholesteric Liquid Crystal Layer

In the present specification, the cholesteric liquid crystal layer refers to a layer obtained by immobilizing a cholesteric liquid crystalline phase. The cholesteric liquid crystal layer is a layer where a cholesteric liquid crystal structure is continuously formed in a layer shape, in which the same optical characteristics are exhibited at any position of the layer.

The details of the cholesteric liquid crystal layer and a functional layer including a plurality of cholesteric liquid crystal layers can be found in the description of a cholesteric liquid crystal layer and a reflective layer in WO2016/052367A.

The reflective screen may include two or more cholesteric liquid crystal layers, for example, two, three, or four cholesteric liquid crystal layers. In particular, it is preferable that the reflective screen includes two cholesteric liquid crystal layers. For example, by using a cholesteric liquid crystal layer as a wide band selective reflecting layer where selective reflection is exhibited in a red wavelength range and a green wavelength range or in a green wavelength range and a blue wavelength range, full color display can be realized by two cholesteric liquid crystal layers.

In an aspect where the reflective screen includes a retardation layer, it is preferable that the cholesteric liquid crystal layer is directly provided on another layer. A laminated film can be provided in which a glass-bonded product or a laminated glass that functions as a projection image display member for converting a projection image into a real image can be manufactured through a procedure of providing an alignment layer that is obtained by applying and curing an amorphous composition including a (meth)acrylate monomer on a surface of the retardation layer to form one cholesteric liquid crystal layer on the surface.

In a case where the cholesteric liquid crystal layer is formed on the alignment layer surface, the in-plane alignment direction of liquid crystals in contact with the alignment layer is random due to physical properties of the alignment layer. Therefore, the cholesteric liquid crystal layer formed by applying the liquid crystal composition to the alignment layer surface can be formed as a layer having alignment defects. In a case where the cholesteric liquid crystal layer is formed on the liquid crystal layer having alignment defects, a layer having alignment defects can also be formed. As a result, the cholesteric liquid crystal layer having diffuse reflectivity can be obtained, and a real image can be displayed. The cholesteric liquid crystal layer having diffuse reflectivity can refer to JP2016-004211A and WO2015/025909A.

Layer including Plurality of Cholesteric Liquid Crystal Dots

The cholesteric liquid crystal dots are obtained by jetting the liquid crystal composition for forming the cholesteric structure directly to the retardation layer or to a surface of the alignment layer or the like, for example, using an ink jet method and drying, aligning, and curing the liquid crystal composition as described above. It is preferable that this cholesteric liquid crystal dot is formed to include a portion where the height continuously increases up to the maximum height of the cholesteric liquid crystal dot from an end part to the center of the cholesteric liquid crystal dot. In addition, it is preferable that a helical axis direction of the cholesteric liquid crystal structure on the surface is substantially perpendicular (70° to)90° to the dot surface (for example, in a case where the surface is curved, a tangent line). The layer including a plurality of cholesteric liquid crystal dots can refer to WO2016/194327A.

As the alignment layer, the same layer as an alignment layer that may be included in a peelable support described below can be used.

Retardation Layer

The reflective screen may include a retardation layer. In the reflective screen according to the embodiment of the present invention, the retardation layer is disposed between the support and the layer having a cholesteric liquid crystal structure. An aspect where the laminate from which the support is peeled off is the reflective screen may also be adopted. By using the retardation layer where a front retardation is appropriately adjusted in combination with the layer having a cholesteric liquid crystal structure, higher brightness can be imparted. In addition, by suppressing reflection of glass or the like, image blur can also be prevented, and a clearer projection image can be displayed.

As the retardation layer, a layer obtained by curing a liquid crystal composition including a polymerizable liquid crystal compound can be used. The reason for this is that a thinner layer can be formed. The retardation layer may be a film obtained by uniaxially aligning the polymerizable liquid crystal compound and immobilizing the alignment. The retardation layer is formed of a layer obtained by applying a liquid crystal composition including a polymerizable liquid crystal compound to a support surface or an alignment film surface. The retardation layer can be formed by nematically aligning the applied polymerizable liquid crystal compound in the liquid crystal composition in a liquid crystal state, and curing the liquid crystal composition to immobilize the alignment state. In this case, the retardation layer can be formed using the same method of forming the above-described cholesteric liquid crystal layer, except that the chiral agent is not added to the liquid crystal composition. During the nematic alignment after the application of the liquid crystal composition, the heating temperature is preferably 50° C. to 120° C. and more preferably 60° C. to 100° C.

The retardation layer may be a layer obtained by applying a composition including a polymer liquid crystal compound to a support surface or an alignment film surface, forming the polymer liquid crystal compound in nematic alignment in a liquid crystal state, and cooling the polymer liquid crystal compound to immobilize the alignment.

The thickness of the retardation layer is preferably 0.2 μm to 10 μm, more preferably 0.5 μm to 5.0 μm, and still more preferably 1.0 μm to 2.5 μm.

As the retardation layer, for example, a λ/4 retardation layer, a λ/2 retardation layer, or a layer having a retardation between λ/4 and λ/2 can be appropriately used. As the retardation layer, a λ/4 retardation layer or a λ/2 retardation layer is preferably used.

The front retardation of the λ/2 retardation layer may be a length that is ½ of a visible wavelength range or "Central Wavelength×n±½ of Central Wavelength (n represents an integer)". In particular, the front retardation of the λ/2 retardation layer only needs to be, for example, a reflection wavelength of the layer having a cholesteric liquid crystal structure (for example, any cholesteric liquid crystal layer) or the length that is ½ of the central wavelength of the luminescence wavelength of the light source. For example, the front retardation of the λ/2 retardation layer only needs to be a retardation in a range of 160 nm to 460 nm and is preferably a retardation in a range of 200 nm to 410 nm.

The front retardation of the λ/4 retardation layer may be a length that is ¼ of a visible wavelength range or "Central Wavelength×n±¼ of Central Wavelength (n represents an integer)". In particular, the front retardation of the λ/4 retardation layer only needs to be, for example, a reflection wavelength of the layer having a cholesteric liquid crystal structure (for example, any cholesteric liquid crystal layer) or the length that is ¼ of the central wavelength of the luminescence wavelength of the light source. For example, the front retardation of the λ/4 retardation layer only needs to be a retardation in a range of 100 nm to 230 nm and is preferably a retardation in a range of 110 nm to 210 nm.

In an aspect where the retardation layer A is a λ/2 retardation layer, it is preferable that a slow axis direction of the λ/2 retardation layer is determined depending on an incidence direction of incidence light of a projector and the sense of helix of the cholesteric liquid crystal layer for use as a projection image display system. For example, in a case where incidence light is incident from the λ/2 retardation layer side (in the present specification, also referred to as "from the observer side") into the layer having a cholesteric liquid crystal structure in a downward (vertical downward) direction of a projection image display portion, it is preferable that a slow axis of the λ/2 retardation layer is in a range of +40° to +65° or in a range of −40° to −65° with respect to a vertical upward direction of the projection image display portion. In addition, it is preferable that the slow axis direction is set as described below depending on the sense of helix of the cholesteric liquid crystal layer in the layer having a cholesteric liquid crystal structure. In a case where the sense is right (preferably in a case where the senses of all of the cholesteric liquid crystal layers are right), it is preferable that a slow axis of the λ/2 retardation layer is in a range of 40° to 65° and preferably 45° to 60° clockwise in a view from the observer side with respect to a vertical upward direction of the projection image display portion. In a case where the sense is left (preferably in a case where the senses of all of the cholesteric liquid crystal layers are left), it is preferable that a slow axis of the λ/2 retardation layer is in a range of 40° to 65° and preferably 45° to 60° counterclockwise in a view from the observer side with respect to a vertical upward direction of the projection image display portion.

In an aspect where the retardation layer A is a λ/4 retardation layer, it is preferable that a slow axis direction of the λ/4 retardation layer is determined depending on an incidence direction of incidence light of a projector and the sense of helix of the cholesteric liquid crystal layer for use as a projection image display system. For example, in a case where incidence light is incident from the λ/4 retardation layer side (in the present specification, also referred to as "from the observer side") into the layer having a cholesteric liquid crystal structure in a downward (vertical downward) direction of a projection image display portion, it is preferable that a slow axis of the λ/4 retardation layer is in a range of +130° to +160° or in a range of −130° to −160° with respect to a vertical upward direction of the projection image display portion. In addition, it is preferable that the slow axis direction is set as described below depending on the sense of helix of the cholesteric liquid crystal layer in the layer having a cholesteric liquid crystal structure. In a case where the sense is right (preferably in a case where the senses of all of the cholesteric liquid crystal layers are right), it is preferable that a slow axis of the λ/4 retardation layer is in a range of 130° to 160° and preferably 130° to 150° clockwise in a view from the observer side with respect to a vertical upward direction of the projection image display portion. In a case where the sense is left (preferably in a case where the senses of all of the cholesteric liquid crystal layers are left), it is preferable that a slow axis of the λ/4 retardation layer is in a range of 130° to 160° and preferably 130° to 150° counterclockwise in a view from the observer side with respect to a vertical upward direction of the projection image display portion.

Next, the light controller 20 will be described.

As shown in FIG. 2, the light controller 20 includes a pair of transparent conductive layers 11, a light control layer 12, a pair of transparent substrates 13, and a pair of alignment layers 21. The light control layer 12 is sandwiched between the pair of transparent conductive layers 11 and includes a front surface 12F and a rear surface 12R. The light control layer 12 includes a polymer network 12a and liquid crystal molecules 12b, the polymer network 12a has a three-dimensional net shape having a plurality of domains 12c that lie in a row, and the liquid crystal molecules 12b are positioned in the domains 12c of the polymer network 12a. Each of the domains 12c is a void that is divided by the nets of the polymer network 12a. The light control layer 12 is formed of a polymer network liquid crystal (PNLC). Among the pair of alignment layers 21, one alignment layer 21 is a first alignment layer 21a positioned between the front surface 12F of the light control layer 12 and a first transparent conductive layer 11a, and another alignment layer 21 is a second alignment layer 21b positioned between the rear surface 12R of the light control layer 12 and a second transparent conductive layer 11b. The first transparent conductive layer 11a is the first electrode in the present invention, and the second transparent conductive layer 11b is the second electrode in the present invention.

The state of the light control layer 12 changes between the first state where light is scattered and the second state where transmission of light is allowed by changing a magnitude of a voltage applied to the light control layer 12.

Each of the alignment layers 21 is a vertical alignment film, and the liquid crystal molecules 12b are aligned such that a direction in which the liquid crystal molecules 12b extend is parallel to a normal direction of a plane where the alignment layers 21 spread out. Therefore, in a case where a voltage is not applied to the light control layer 12, the state of the light control layer 12 is the second state where transmission of light is allowed. In a case where a voltage is not applied to the light control layer 12, the plurality of liquid crystal molecules 12b are positioned and arranged in the domains 12c such that a direction in which the liquid crystal molecules 12b extend is parallel to the normal direction of the plane where the alignment layers 21 spread out, that is, is parallel to the normal direction of the front surface 12F and the rear surface 12R of the light control layer 12.

For example, in a case where a voltage is not applied to the light control layer 12, the state of the light control layer 12 is the second state. In a case where a voltage is not applied to the light control layer 12, the liquid crystal molecules 12b are arranged such that the direction in which the liquid crystal molecules 12b extend, in other words, the longitudinal direction in at least a part of the plurality of liquid crystal molecules 12b is parallel to one direction intersecting the front surface 12F and the rear surface 12R, for example, the normal direction of the front surface 12F and the rear surface 12R. Thus, light is likely to transmit through the light control layer 12 from the front surface 12F to the rear surface 12R and from the rear surface 12R to the front surface 12F. As a result, the haze value of the light control layer 12 is less than that in a case where a voltage is applied to the light control layer 12.

On the other hand, in a case where a predetermined voltage is applied to the light control layer 12, the state of the light control layer 12 is the first state. In a case where the voltage is applied to the light control layer 12, the plurality of liquid crystal molecules 12b are positioned and arranged irregularly in the domains 12c. Thus, light is not likely to transmit through the light control layer 12 from the front surface 12F to the rear surface 12R and from the rear surface 12R to the front surface 12F. As a result, the haze value of the light control layer 12 is more than that in a case where a voltage is not applied to the light control layer 12.

This way, the light control layer 12 is a reverse type light control layer, in which in a case where the voltage is applied to the light control layer 12, the haze value of the light control layer 12 is relatively large, and in a case where a voltage is not applied to the light control layer 12, the haze value of the light control layer 12 is relatively small. As described above, the reverse type light control layer 12 is realized by the light control layer 12 and the pair of alignment layers 21 between which the light control layer 12 is sandwiched.

The haze values that can be adopted by the light control layer 12 may be only a first value corresponding to the first state and a second value corresponding to the second state, or the light control layer 12 can also adopt an intermediate value between the maximum haze value and the minimum haze value depending on the magnitude of the voltage applied. In addition, in a case where the light control layer 12 can adopt at least one intermediate value, this intermediate value may be a haze value corresponding to the first state of the light control layer 12 or a haze value corresponding to the second state of the light control layer 12.

On the front surface 12F of the light control layer 12 and the rear surface 12R of the light control layer 12, the maximum length in a region occupied by each of the domains 12c in the polymer network 12a is a domain diameter D of the domain 12c. The maximum length of the region occupied by each of the domains 12c is the length of a straight line having a maximum length among straight lines that pass through the centroid of the domain 12c. The average value of the domain diameters D is, for example, 0.1 μm or more and 3 μm or less, preferably 0.2 μm or more and 2 μm or less, and more preferably about 1 μm.

By setting the average value of the domain diameters D to be 0.1 μm or more and 3 μm or less, the light control layer 12 is likely to include the domains 12c having a size that is substantially equal to the wavelength of visible light. Therefore, substantially the same amount of light in the wavelength range of visible light is absorbed irrespective of the wavelengths. Therefore, transmitted light can be recognized as gray. In addition, a decrease in the scattering angle of light scattered by the polymer network 12a is suppressed as compared to a case where the domain diameter D is more than 3 μm. In addition, in a case where the average value of the domain diameters D is 1 μm or less, for example, 200 nm or more and 800 nm or less, the amount of light component scattered in a light traveling direction is not that more than the amount of light components scattered in other directions. Therefore, a variation in brightness on the front surface of the light control layer 12 can be further suppressed.

In the light control layer 12, the mode of the domain diameter D is preferably in a range of 0.1 μm or more and 3μm or less. In addition, both of the minimum value and the maximum value of the domain diameter D are preferably in a range of 0.1 μm or more and 3 μm or less.

In the polymer network 12a, the number of the domains 12c divided by the polymer network 12a per unit area is a domain density that is the density of the domains 12c in the light control layer 12. The domain density is preferably $2 \times 10^7$ pieces/mm$^3$ or more and $2 \times 10^{12}$ pieces/mm$^3$ or less. The domain density of the polymer network 12a can be calculated from an image obtained by imaging a cross-sectional structure of the light control layer 12 with a scanning electron microscope.

By setting the domain density to be $2 \times 10^7$ pieces/mm$^3$ or more, light incident from the rear surface 12R of the light control layer 12 into the light control layer 12 is likely to be absorbed in the light control layer 12. As a result, a variation in density in a plane of the front surface 12F of the light control layer 12 is suppressed. By setting the domain density to be $2 \times 10^{12}$ pieces/mm$^3$ or less, the domain density is excessively high such that the amount of light transmitted from the rear surface 12R of the light control layer 12 to the front surface 12F is suppressed to be low, and a decrease in the lightness of an image recognized by the observer is suppressed.

In the PNLC, the magnitude of an alternating current voltage for driving the liquid crystal molecules 12b depends on characteristics in the structure of the polymer network 12a. More specifically, the magnitude of the alternating current voltage for driving the liquid crystal molecules 12b depends on the size of the domains 12c, the shape of the domains 12c, that is, the shape of the nets that divide the domains 12c, the thickness of the polymer network 12a, and the like. In addition, the magnitude of the alternating current voltage for driving the liquid crystal molecules 12b is set such that desired transmission and absorption of light in the light control layer 12 is realized.

In order to realize desired transmission and absorption of light as the reflective screen 10 in a case where the effective value of the alternating current voltage is in a range of 100 V or lower, it is preferable that the sizes of the plurality of domains 12c are appropriate and uniform, and it is also preferable that the shapes of the domains 12c are the same.

From this viewpoint, as described above, the average value of the domain diameters D is preferably 0.1 μm or more and 3 μm or less. In addition, in a case where the average value of the domain diameters D is 0.1 μm or more and 3 μm or less and the domain density is $2 \times 10^7$ pieces/mm$^3$ or more and $2 \times 10^{12}$ pieces/mm$^3$ or less, the net-shaped polymer network 12a in which a variation in the size of the domains 12c can realize the transmission and absorption of light in the first state.

The thickness T of the light control layer 12 is preferably 1 μm or more and 50 μm or less, more preferably 5 μm or more and 50 μm or less, and still more preferably 5 μm or more and 25 μm or less. By setting the thickness T of the light control layer 12 to be 1 μm or more, light incident from the rear surface 12R of the light control layer 12 into the light control layer 12 is scattered to the degree to which a variation in brightness in a plane of the front surface 12F of the light control layer 12 is suppressed until the light is emitted from the front surface 12F of the light control layer 12. By setting the thickness of the light control layer 12 to be 50 μm or less, the amount of light transmitted through the light control layer 12 from the rear surface 12R of the light control layer 12 to the front surface 12F is suppressed to be low, and a decrease in the lightness of an image recognized by the observer is suppressed.

In a case where the light control layer 12 is in the second state, a total light transmittance of the light control layer 12 is preferably 50% or more and more preferably 73% or more. In a case where the total light transmittance of the light control layer 12 where the domain diameter D is 0.1 μm or more and 3 μm or less is in the above-described range, the viewing angle of the reflective screen 10 is likely to spread out.

The total light transmittance of each of the layers can be measured using a method defined by JIS K 7361-1 (ISO 13468-1).

Light Control Layer

As described above, the light control layer 12 includes the polymer network 12a and the plurality of liquid crystal molecules 12b that are positioned in the domains 12c in the polymer network 12a. The polymer network 12a is polymer fiber. A resin for forming the polymer network 12a may be any one of a thermosetting resin or an ultraviolet curable resin.

In addition, in the light control layer 12, it is preferable that materials for forming the polymer network 12a include a monomer having a polar group and a bifunctional monomer. In addition to the above-described resin, the monomer having a polar group and the bifunctional monomer are polymerizable by applying heat or by irradiation of ultraviolet light. As the monomer having a polar group, a monomer having at least one polar group selected from the group consisting of a hydroxy group, a carboxy group, and a phosphate group can be used.

As the liquid crystal molecules 12b, any of liquid crystal molecules forming nematic liquid crystal, liquid crystal molecules forming smectic liquid crystal, or liquid crystal molecules forming cholesteric liquid crystal can be used.

In a case where the resin forming the polymer network 12a is an ultraviolet curable resin, the light control layer 12 can be manufactured using the following manufacturing method. First, a liquid crystal composition including the liquid crystal molecules 12b and a photopolymerizable compound is sealed between the pair of transparent conductive layers 11. Next, the sealed liquid crystal composition is irradiated with ultraviolet light, for example, from the side of the first transparent conductive layer 11a opposite to the liquid crystal composition and the side of the second transparent conductive layer 1 1b opposite to the liquid crystal composition. As a result, the photopolymerizable compound is photopolymerized into a polymer, and the polymer network 12a having the countless fine domains 12c is formed by photopolymerization and crosslinking.

As long as a method of irradiating the sealed liquid crystal composition simultaneously from both sides is adopted, a variation in polymerization rate in the photopolymerizable compound in the thickness direction of the polymer network 12a can be suppressed. As a result, in both of the plane direction of the transparent conductive layer 11 and the thickness direction of the light control layer 12, a variation in the sizes of the domains 12c and a variation in the shape of the domains 12c can be suppressed.

The method of manufacturing the light control layer 12 is described in JP4387931B. In a case where the light control layer 12 according to the embodiment is manufactured, a method defined by the manufacturing method described in JP4387931B can be adopted. As described above, this manufacturing method is effective for manufacturing the polymer network 12a in which the size and the shape of the domains 12c are controlled.

The light control layer 12 may include a colorant having a predetermined color that does not inhibit the motion of the liquid crystal molecules 12b corresponding to the magnitude of the alternating current voltage applied to the light control layer 12. With this configuration, the light control layer 12 can have a predetermined color.

The transparent conductive layer 11 allows transmission of light and applies a voltage to the light control layer 12. The transparent conductive layer 11 is positioned on each of the front surface 12F and the rear surface 12R of the light control layer 12. Among the two transparent conductive layers 11, the transparent conductive layer 11 positioned on the front surface 12F of the light control layer 12 is the first transparent conductive layer 11a, and the transparent conductive layer 11 positioned on the rear surface 12R of the light control layer 12 is the second transparent conductive layer 11b.

As the transparent conductive layer, various transparent electrode materials that can be applied to this type of transparent resin film can be used. For example, an oxide-based transparent metal thin film having a total light transmittance of 50% or more can be used. Examples of the transparent conductive layer include a tin oxide film, an indium oxide film, and a zinc oxide film.

Examples of the tin oxide ($SnO_2$) film include nesa (tin oxide; $SnO_2$), antimony tin oxide (ATO), and fluorine-doped tin oxide.

Examples of the indium oxide ($In_2O_3$) film include indium oxide, indium tin oxide (ITO), and indium zinc oxide (IZO).

Examples of the zinc oxide (ZnO) film include zinc oxide, aluminum-doped zinc oxide (AZO), and gallium-doped zinc oxide.

In the embodiment, it is preferable that the transparent conductive film is formed of indium tin oxide (ITO).

In addition, as a material for forming the transparent conductive layers 11, a conductive polymer as a polymer having light transmittance and conductivity can be used. As the conductive polymer, a π-conjugated conductive polymer or a polymer including polyanion is preferably used. Examples of the conductive polymer include polyethylene dioxythiophene (PEDOT:PSS).

In a case where the material for forming the transparent conductive layer 11 is ITO and light transmitted through the light control layer 12 is incident into the transparent conductive layers 11, scattering and reflection of light that depend on the crystal structure of the transparent conductive layer 11 occur in the transparent conductive layers 11. Therefore, light incident from the light control layer 12 into the transparent conductive layer 11 includes light components that are scattered backward, that is, light components that are scattered to the rear surface 12R of the light control layer 12. In addition, in the light incident from the light control layer 12 into the transparent conductive layers 11, light components that are scattered forward, that is, light components that are scattered to the side of the transparent conductive layer 11 opposite to the light control layer 12 have a tendency that the color of the light component becomes white by mixing of light components having different colors.

On the other hand, in a case where the material for forming the transparent conductive layer 11 is PEDOT:PSS, the amount of light components that are scattered backward is small, and high contrast is recognized in an image displayed on the reflective screen by light components that are scattered forward as compared to a case where the material for forming the transparent conductive layer 11 is ITO.

The contrast refers to a ratio of a high brightness to a low brightness on the surface as the screen surface of the reflective screen in a state where light is projected to the reflective screen. The high brightness refers to the maximum value of the brightness on the surface, and the low brightness refers to the minimum value of the brightness on the surface.

In addition, in order to improve the contrast on the surface of the reflective screen, not only a configuration of increasing the high brightness on the surface but also a configuration of reducing the low brightness on the surface are also adopted as the configuration of the reflective screen. In order to reduce the low brightness on the surface, the lightness of the color on the surface may be reduced, or the reflective screen may be configured such that light scattered on the reflective screen has a predetermined color other than white.

It is preferable that the total light transmittance of the transparent conductive layer 11 is higher than the total light transmittance of the light control layer 12 in a case where the light control layer 12 is in the first state. As a result, the total light transmittance of the reflective screen is suppressed to be lower than the total light transmittance of the light control layer 12.

The light controller 20 further includes the pair of transparent substrates 13, and the pair of transparent conductive layers 11 are sandwiched between the pair of transparent substrates 13 in the thickness direction of the light controller 20. The pair of transparent substrates 13 include a first transparent substrate 13a and a second transparent substrate 13b, the first transparent substrate 13a is positioned on a surface of the first transparent conductive layer 11a opposite to a surface in contact with the front surface 12F of the light control layer 12, and the second transparent substrate 13b is positioned on a surface of the second transparent conductive layer 11b opposite to a surface in contact with the rear surface 12R of the light control layer 12. The first transparent substrate 13a and the first transparent conductive layer 11a form a first transparent film 14a, and the second transparent substrate 13b and the second transparent conductive layer 11b form a second transparent film 14b. The pair of transparent substrates 13 has light transmittance, and a material for forming each of the transparent substrates 13 may be various resins.

It is preferable that the total light transmittance of the transparent substrates 13 is higher than the total light transmittance of the light control layer 12 in a case where the light control layer 12 is in the first state. As a result, the total light transmittance of the reflective screen is suppressed to be lower than the total light transmittance of the light control layer 12. The thickness of the transparent substrates 13 is preferably 50 μm or more and 200 μm or less.

As the transparent substrates 13, a resin film having flexibility can also be used. By the transparent substrates 13 having flexibility, the reflective screen also has flexibility. This reflective screen is applicable to a member having a curved shape except that it is laminated in a flat member such as glass, and the reflective screen can be accommodated in a wound state. This way, with the reflective screen having flexibility, the degree of freedom for handling is improved.

As the transparent substrate 13, various transparent resin films can be applied, and it is desirable to apply a transparent resin film having low optical anisotropy and a transmittance of 80% or more in a visible range (380 to 800 nm).

Examples of a material of the transparent resin film include an acetyl cellulose resin such as triacetyl cellulose (TAC), a polyester resin such as polyethylene terephthalate (PET) or polyethylene naphthalate (PEN), a polyolefin resin such as polyethylene (PE), polypropylene (PP), polystyrene, polymethylpentene, or EVA, a vinyl resin such as polyvinyl chloride or polyvinylidene chloride, and a resin such as an acrylic resin, a polyurethane resin, polysulfone (PEF), polyethersulfone (PES), polycarbonate (PC), polysulfone, polyether (PE), polyether ketone (PEK), (meth)acrylonitrile, a cycloolefin polymer (COP), or a cycloolefin copolymer.

In particular, a resin such as polycarbonate (PC), a cycloolefin polymer (COP), or polyethylene terephthalate (PET) is preferable.

Alignment Layer

As a material for forming the alignment layer 21, a resin that is curable by irradiation of heat or a resin that is curable by irradiation of an ionizing radiation such as ultraviolet light or electron beams can be used. Examples of the resin include a thermosetting resin, an ultraviolet curable resin, and an electron beam curable resin. Among these, an ultraviolet curable resin is preferable as the material for forming the alignment layer.

Examples of the ultraviolet curable resin include a resin including at least one of a polymerizable oligomer or monomer having an acryloyl group or a polymerizable oligomer or monomer having a vinyl group and a photopolymerization initiator. The ultraviolet curable resin may include an additive other than the photopolymerization initiator.

Examples of the polymerizable oligomer or monomer having an acryloyl group include urethane acrylate, epoxy acrylate, polyester acrylate, polyether acrylate, and melamine acrylate. Examples of the polymerizable oligomer or monomer having a vinyl group include acrylic acid, acrylamide, acrylonitrile, and styrene.

The alignment layer 21 is a film for arranging liquid crystal molecule groups in a given direction. For example, the alignment layer 21 may be prepared as a photoalignment layer, may be prepared as an alignment layer by rubbing treatment instead of a photoalignment layer, or may be prepared by shaping a fine linear unevenness shape. The method of preparing the alignment layer 21 is not limited to the above-described method, and different methods may be appropriately used. In the embodiment, a photodimerization type material is used. Examples of the photodimerization type material a polymer having cinnamate, coumarin, benzylidene phthalimidine, benzylidene acetophenone, diphenylacetylene, stilbazole, uracil, quinolinone, maleimide, or a cinnamylidene acetate derivative. In particular, from the viewpoint of improving an alignment restriction force, a polymer having either or both of cinnamate and coumarin is preferably used. Specific examples of the photodimerization type material include compounds described in JP 1997-118717A (JP-H9-118717A), JP1998-506420A (JP-H10-506420A), JP2003-505561A, and WO2010/150748A.

The alignment layer 21 may have fine unevenness on a surface opposite to a surface in contact with the transparent conductive layer 11. With the fine unevenness in the alignment layer 21, the liquid crystal molecules 12b positioned in the alignment layer 21 can be aligned in a predetermined direction.

A surface opposite to the surface of the first transparent substrate 13a in contact with the front surface 12F of the light control layer 12 is a front surface 20F of the light controller 20, and a surface opposite to the surface of the second transparent substrate 13b in contact with the rear surface 12R of the light control layer 12 is a rear surface 20R of the light controller 20. In the thickness direction of the light controller 20, the front surface 20F of the light controller 20, the front surface 12F of the light control layer 12, the rear surface 12R of the light control layer 12, and the rear surface 20R of the light controller 20 are arranged in this order.

A guest host liquid crystal composition including a dichroic colorant composition can also be applied to the light control layer. The guest host liquid crystal composition may include a chiral agent such that, in a case where the liquid crystal material is horizontally aligned, the liquid crystal material is helically aligned in the thickness direction of the light control layer.

The light control layer 12 is formed of a vertical alignment layer where an alignment restriction force for pretilting the alignment layer in a given direction is set such that the alignment of the guest host liquid crystal composition during light shielding is in a state where an electric field is applied. As a result, the light control layer 12 is formed of a normally clear structure. Here, the normally clear structure is a transparent structure where the transmittance is the highest in a case where a voltage is not applied to the liquid crystal.

In addition, as a liquid crystal driving type, various driving types such as a twisted nematic (TN) type, a vertical alignment (VA) type, or an in-plane switching (IPS) type are known, and these well-known driving types can be appropriately selected and used.

Here, as described above, although the screen according to the embodiment of the present invention includes the light control layer 12, the screen does not include a light diffusion layer including a diffusion material such as particles having a diffusion action.

In a semi-transmission type reflective screen that includes a diffusion layer including diffusion particles in the related art, video light is diffused twice before and after reflection from the reflective layer. Therefore, there is a problem in that a high viewing angle can be obtained but the resolution of a video decreases. In addition, external light is also diffused by the diffusion particles. Therefore, a scenery on the opposite side of the screen is blurred or is observed white such that the transparency deteriorates.

However, preferably, the reflective screen 10 according to the embodiment of the present invention does not have the diffusion action in portions other than the light reflecting layer 1 that has a stripe patterned waving structure. Therefore, video light is diffused only during reflection. In addition, in the reflective screen 10 according to the embodiment of the present invention, only light reflected from the light reflecting layer 1 is diffused, and transmitted light is not diffused. Accordingly, in the reflective screen 10 according to the embodiment of the present invention, a video having an excellent viewing angle and resolution can be displayed, a scenery on the opposite side of the reflective screen 10 is clearly recognized without becoming white or being blurred, and high transparency can be realized. In addition, in the reflective screen 10 according to the embodiment of the present invention, even in a state where video light is projected to the reflective screen 10, a part of a scenery on the opposite side (rear side) of the reflective screen 10 can be recognized.

Projection Image Display System

A projection image display system according to the embodiment of the present invention comprises:

the above-described reflective screen; and a projector that projects video light to the reflective screen.

<Projector>

In the present specification, "projector" is "a device that projects light or an image" and includes "a device that projects a drawn image." In the projection image display system, the projector only needs to be disposed such that light can be incident into the reflective screen bonded to the glass plate at an oblique incidence angle described above.

In the projection image display system, it is preferable that the projector includes a drawing device such that light is focused on the reflective screen to allow the reflective screen to display a real image.

Drawing Device

The drawing device may be a device that displays an image or may be a device that emits light capable of drawing an image. In the drawing device, light from a light source only needs to be adjusted with a drawing method such as an optical modulator, a laser brightness modulation unit, or an optical deflection unit for drawing. In the present specification, the drawing device refers to a device that includes a light source and further includes an optical modulator, a laser brightness modulation unit, or an optical deflection unit for drawing depending on drawing methods.

(Light Source)

The light source is not particularly limited. For example, a light emitting diode (LED; including an organic light emitting diode (OLED), a discharge tube, or a laser light source can be used. Among these, a LED or a laser light source is preferable. The reason for this is that a LED or a laser light source is suitable as the light source of the drawing device that emits linearly polarized light.

(Drawing Method)

The drawing method can be selected depending on the light source or applications and is not particularly limited.

Examples of the drawing method include a fluorescent display tube, a liquid crystal display (LCD) method and a liquid crystal on silicon (LCOS) method using liquid crystal, a digital light processing (DLP; registered trade name) method, and a scanning method using a laser. The drawing method may be a method using a fluorescent display tube integrated with a light source.

In the LCD method and the LCOS method, light components having colors are modulated and multiplexed by the optical modulator and are emitted from a projection lens.

The DLP method is a display system using a digital micromirror device (DMD), in which a number of micromirrors corresponding to the number of pixels are disposed to draw light and to emit the light from a projection lens.

In the scanning method, the screen is scanned with a ray such that an image is formed using an afterimage effect of eyes. For example, the scanning method can refer to JP1995-270711A (JP-H7-270711A) or JP2013-228674A. In the scanning method using a laser, laser beams having colors (for example, red light, green light, blue light) of which the brightness is modulated may be combined into one ray by a multiplexing optical system or a condenser lens, and this ray may be drawn on an intermediate image screen described below by scanning using an optical deflection unit.

In the scanning method, the brightness modulation of the laser beams having colors (for example, red light, green light, blue light) may be directly performed as a change in the intensity of the light source or may be performed by an external modulator. Examples of the optical deflection unit include a galvanometer mirror, a combination of a galvanometer mirror and a polygonal mirror, and a micro electromechanical system (MEMS). Among these, a MEMS is preferable. Examples of the scanning method include a random scanning method and a raster scanning method. In particular, it is preferable to use a raster scanning method. In the raster scanning method, for example, laser light can be driven in the horizontal direction using a resonance frequency and is driven in the vertical direction using a sawtooth wave. In the scanning method, a projection lens is not necessary, and the size of the device can be easily performed.

Emitted light from the drawing device may be linearly polarized light or natural light (non-polarized light). Actually, emitted light from the drawing device in the real image display system is preferably linearly polarized light. In the drawing device where the drawing method is an LCD or a LCOS and the drawing device using a laser light source, basically, emitted light is linearly polarized light. In a case where the emitted light of the drawing device is linearly polarized light and includes light components having a plurality of wavelengths (colors), it is preferable that polarization directions (transmission axis directions) of the plurality of light components are the same as or perpendicular to each other. As a commercially available drawing device, a device where polarization directions of emitted light in wavelength ranges of red, green, and blue are not uniform is known (refer to JP2000-221449A). Specifically, an example where the polarization direction of green light is perpendicular to the polarization direction of red light and the polarization direction of blue light.

Projection Light (Incidence Light)

It is preferable that incidence light is incident at an oblique incidence angle of 40° to 70° with respect to the normal line of the projection image display portion. By reflecting projection light from a front surface or a rear surface of laminated glass such that the light is diffuse-reflected again by the reflective screen, image blur caused by multiple images occurs. In a method of reducing the image blur, it is effective to cause projection light (p polarized light) to be incident into a glass surface at Brewster's angle and to approximate reflected light from the glass surface to zero (for example, refer to JP2006-512622A). In an aspect where a member for real image display including the retardation layer A is bonded to glass, the Brewster's angle of an interface between the glass having a refractive index of about 1.51 and air having a refractive index of 1 is about 56°. In a case where p polarized light is incident from the glass side in the above-described angle range, circularly polarized light that is selectively reflected by the layer having a cholesteric liquid crystal structure is converted into p polarized light by the retardation layer A. Therefore, the amount of reflected light from the glass is small, and image display where image blur is suppressed can be performed. Therefore, the angle is preferably 50° to 65°.

In an aspect where the reflective screen according to the embodiment of the present invention includes the retardation layer A, incidence light may be incident into the layer having a cholesteric liquid crystal structure from the retardation layer A side with respect to the layer having a cholesteric liquid crystal structure through the retardation layer A. That is, the retardation layer A may be disposed on the incidence side of projection light with respect to the layer having a cholesteric liquid crystal structure. In addition, incidence light may be incident from any direction such as an up-down direction of laminated glass and may be determined according to a direction of the observer. For example, incidence light may be incident at an oblique incidence angle described below from the lower direction during use.

As described above, it is preferable that projection light during projection image display in the projection image display system is p polarized light that vibrates in a direction parallel to an incident surface. In a case where the emitted light of the projector is not linearly polarized light, p polarized light may be obtained by disposing a linear polarizing film on the emitted light side of the projector and using the linear polarizing film, or p polarized light may be obtained on an optical path from the projector to the laminated glass. As described above, in the projector where the polarization directions of emitted light in wavelength ranges of red light, green light, and blue light are not uniform, it is preferable that the polarization directions are wavelength-selectively adjusted such that incidence light is incident as p polarized light in the wavelength ranges of all of the colors.

It is effective to use the reflective screen according to the embodiment of the present invention in combination with a projector including a laser or a LED or OLED as a light source where the luminescence wavelength is not continuous in a visible range. The reason for this is that the central wavelength of selective reflection of the cholesteric liquid crystal layer can be adjusted depending on the luminescence wavelengths.

In the present invention, it is preferable that the projection image display system includes a voltage application unit and a controller.

The voltage application unit applies an alternating current voltage to the light control layer through the first electrode (first transparent conductive layer) and the second electrode (second transparent conductive layer).

The controller controls the projector and the voltage application unit.

In the projection image display system, it is preferable that the controller controls driving of the projector and driving of the voltage application unit such that a period of a frame in the projector and a period of the alternating current voltage in the voltage application unit are different from each other.

As a result, the transmittance can be freely controlled depending on the brightness of a scenery, and only in a case where the scenery is bright such that the visibility deteriorates, a power supply can be turned on such that the light control layer acts to obtain a high visibility state.

EXAMPLES

Hereinafter, the present invention will be described in detail using Examples. Materials, reagents, amounts thereof, proportions thereof, operations, and the like shown in the following examples can be appropriately changed as long as they do not depart from the scope of the present invention. Accordingly, the present invention is not limited to the following examples.

Example 1

<Preparation of Reflective Screen>

As a reflective screen according to Example 1, a reflective screen where a cholesteric liquid crystal layer, a light control layer, a pair of transparent conductive layers, and a pair of transparent substrates had the following configuration was prepared.

<Preparation of Alignment Layer Y1>

As a peelable support, a coating liquid Y1 for an alignment layer having the following composition was applied using a #3.6 wire bar coater to a surface of COSMOSHINE A-4100 (manufactured by Toyobo Co., Ltd., PET, thickness: 75 µm) on which an adhesion-enhancing treatment was not performed. Next, the laminate was dried at 45° C. for 60 seconds and was irradiated with ultraviolet light at 500 mJ/cm$^2$ at 25° C. using an ultraviolet irradiation device. As a result, an alignment layer Y1 with the peelable support was prepared.

(Coating Liquid Y1 for Alignment Layer)

| | |
|---|---|
| KAYARAD PET30 (manufactured by Nippon Kayaku Co., Ltd.) | 100 parts by mass |
| IRGACURE 907 (manufactured by BASF SE) | 3.0 parts by mass |
| KAYACURE DETX (manufactured by Nippon Kayaku Co., Ltd.) | 1.0 part by mass |
| Fluorine horizontal alignment agent F1 | 0.01 parts by mass |
| Methyl isobutyl ketone | 243 parts by mass |

Fluorine horizontal alignment agent F1

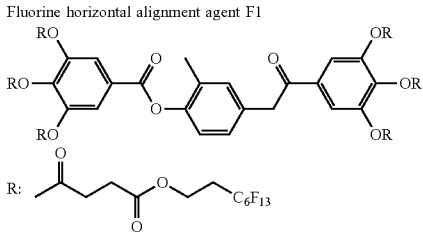

<Preparation of Cholesteric Liquid Crystal Layers B1, G1, and R1>

(Coating Liquid B1, G1, and R1 for Cholesteric Liquid Crystal Layer)

The following components were mixed to prepare a coating liquid for forming a cholesteric liquid crystal layer having the following composition.

| | |
|---|---|
| Mixture of compounds 1 | 100 parts by mass |
| Fluorine alignment agent F3 | shown in Table 1 |
| Dextrorotatory chiral agent LC-756 (manufactured by BASF SE) | shown in Table 1 |
| IRGACURE OXE01 (manufactured by BASF SE) | 1.5 parts by mass |
| Methyl ethyl ketone | shown in Table 1 |
| Cyclohexanone | shown in Table 1 |

Mixture of Compounds 1 (the numerical values are represented by mass %)

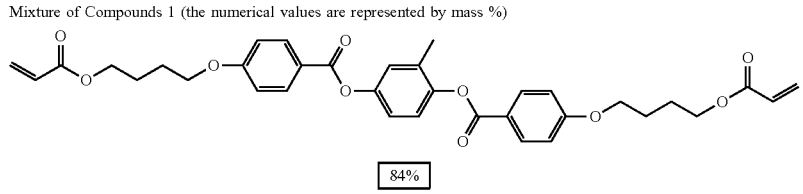

84%

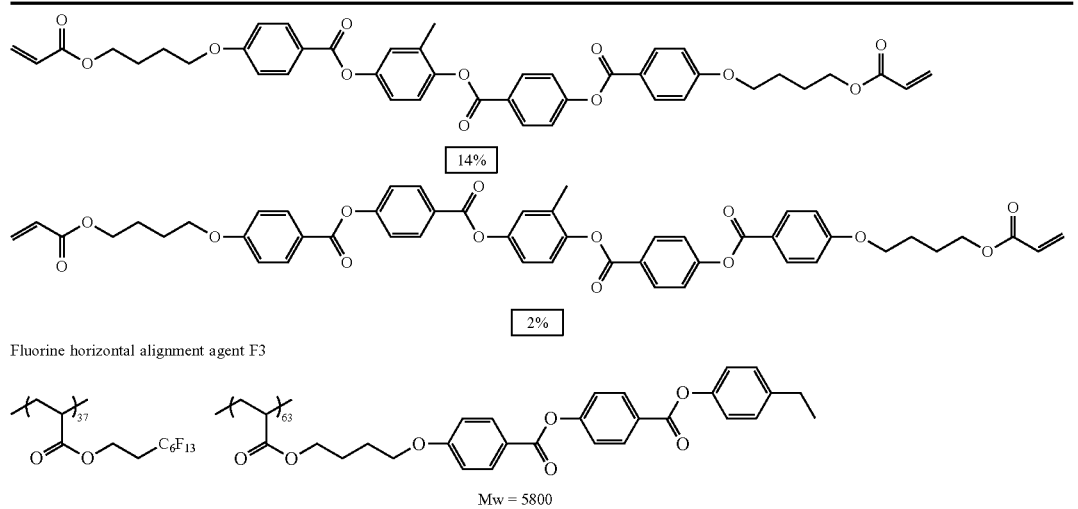

Fluorine horizontal alignment agent F3

Mw = 5800

The amounts of the fluorine horizontal alignment agent F3 and the chiral agent LC-756 in the coating liquid composition, the amount of methyl ethyl ketone, and the amount of cyclohexanone were adjusted to prepare cholesteric liquid crystal coating liquids B1, G1, and R1. Using each of the coating liquids, a single cholesteric liquid crystal layer was prepared on the peelable support with the same method as that of a display member RS-1 described below, and reflection characteristics were verified. As a result, it was found that all of the prepared cholesteric liquid crystal layers were right circularly polarized light reflecting layers, and the central reflection wavelength was as shown in Table 1 below.

TABLE 1

| Coating liquid | F3 | LC-756 | Methyl ethyl ketone | Cyclo-hexanone | Central reflection wavelength |
|---|---|---|---|---|---|
| Coating liquid B1 | 0.68 parts by mass | 6.06 parts by mass | 354 parts by mass | 62 parts by mass | 482 nm |
| Coating liquid G1 | 0.77 parts by mass | 4.71 parts by mass | 415 parts by mass | 73 parts by mass | 606 nm |
| Coating liquid R1 | 0.70 parts by mass | 4.24 parts by mass | 369 parts by mass | 65 parts by mass | 667 nm |

The coating liquid B1 for a cholesteric liquid crystal layer prepared as described above was applied using a #3 wire bar coater to a surface of the alignment layer Y1 with the peelable support. Next, the coating liquid was dried at 45° C. for 60 seconds and was irradiated with ultraviolet light at 500 mJ/cm² at 40° C. using an ultraviolet irradiation device. As a result, a cholesteric liquid crystal layer B1 reflecting light having a central wavelength of 482 nm was prepared. The coating liquid G1 for a cholesteric liquid crystal layer prepared as described above was applied to a surface of the cholesteric liquid crystal layer B1 using a #3 wire bar coater. Next, the coating liquid was dried at 45° C. for 60 seconds and was irradiated with ultraviolet light at 500 mJ/cm² at 40° C. using an ultraviolet irradiation device. As a result, a cholesteric liquid crystal layer G1 reflecting light having a central wavelength of 606 nm was laminated. The coating liquid R1 for a cholesteric liquid crystal layer prepared as described above was applied to a surface of the cholesteric liquid crystal layer G1 using a #3 wire bar coater. Next, the coating liquid was dried at 45° C. for 60 seconds and was irradiated with ultraviolet light at 500 mJ/cm² at 40° C. using an ultraviolet irradiation device. As a result, a cholesteric liquid crystal layer R1 reflecting light having a central wavelength of 667 nm was laminated. Further, by peeling off the peelable support, a display member RS-1 was prepared.

As the light controller, a light controller where a light control layer was sandwiched between a pair of transparent conductive layers was prepared.

The light control layer was formed of PNLC, the thickness was 20 μm, the average value of the domain diameters was 1 and the domain density was 1.0×10⁹ pieces/mm³. Each of the pair of transparent conductive layers was formed of ITO, and the thickness was 50 nm. Each of the pair of transparent substrates was formed of PET, and the thickness was 50 μm. A dichroic colorant composition was added to PNLC, and the tint was adjusted to gray.

By bonding the display member RS-1 and the light controller to each other using a pressure sensitive adhesive SK2057 (manufactured by Soken Chemical & Engineering Co., Ltd.), the reflective screen according to the embodiment of the present invention was obtained. The light controller was bonded to the alignment layer side of the display member RS-1.

Example 2

<Preparation of Retardation Layer RE-2>
(Coating Liquid RE-2 for Forming Retardation Layer)
The following components were mixed to prepare a coating liquid RE-2 for forming a retardation layer having the following composition.

| | |
|---|---|
| Mixture of compounds | 1100 parts by mass |
| Fluorine horizontal alignment agent F1 | 0.01 parts by mass |
| Fluorine horizontal alignment agent F2 | 0.05 parts by mass |
| IRGACURE OXE01 (manufactured by BASF SE) | 1.0 parts by mass |

| | |
|---|---|
| Methyl ethyl ketone | an amount in which the solute concentration was 25 mass % |

Fluorine horizontal alignment agent F2

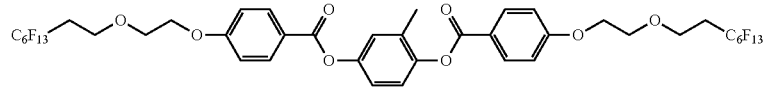

As a peelable support, a surface of COSMOSHINE A-4100 (manufactured by Toyobo Co., Ltd., PET, thickness: 75 μm) on which an adhesion-enhancing treatment was not performed was rubbed in a direction rotated by 60° counterclockwise from the TD direction, and a coating liquid RE-2 for forming a retardation layer was applied using a wire bar. Next, the coating liquid was dried at 50° C. for 60 seconds and was irradiated with ultraviolet light at 500 mJ/cm$^2$ at 50° C. using an ultraviolet irradiation device to immobilize the liquid crystal phase. As a result, a retardation layer RE-2 with the peelable support including the retardation layer having a thickness of 0.72 μm was prepared. In this case, a front retardation Re(550) of the retardation layer at a wavelength of 550 nm was measured using AxoScan (manufactured by Axometrics, Inc.), and Re(550) was 140 nm.

The alignment layer and the cholesteric liquid crystal layers B1, G1, and R1 were formed on the retardation layer in this order using the same method as that of the preparation of the display member RS-1, except that the retardation layer RE-2 with the peelable support was used instead of the peelable support A-4100. As a result, a display member RS-2 was prepared.

By bonding the display member RS-2 and the light controller to each other using a pressure sensitive adhesive SK2057 (manufactured by Soken Chemical & Engineering Co., Ltd.), the reflective screen was prepared. The light controller was bonded to the retardation layer RE-2 side of the display member RS-2.

Comparative Example 1

In Comparative Example 1, a reflective screen having a normally clear configuration described in paragraph "0063" of JP2019-132973A was prepared.
<Evaluation>
The results of performing measurement and evaluation using each of the reflective screens prepared in Examples are shown in Table 2 below.
<Measurement of Integral Reflectivity>
Using a device in which a large integrating sphere device (ILV-471, manufactured by JASCO Corporation) was attached to a spectrophotometer (V-550, manufactured by JASCO Corporation), an integral reflection spectrum of the reflective screen was measured to include specularly reflected light without using optical trap such that light was incident from the R1 layer side shown in Table 2. In the obtained integral reflection spectrum, a maximum reflectivity at a wavelength of 620 to 680 nm was obtained as integral reflectivity. It is known that, regarding the selective reflection center wavelength of the cholesteric liquid crystal layer, short wavelength shift occurs by swinging the detection angle. A reflection band measured at a wavelength of 620 to 680 nm during vertical incidence corresponds to a reflection band at about a wavelength of 550 nm in a case where light is incident from a polar angle of 60°.

Figure 3:
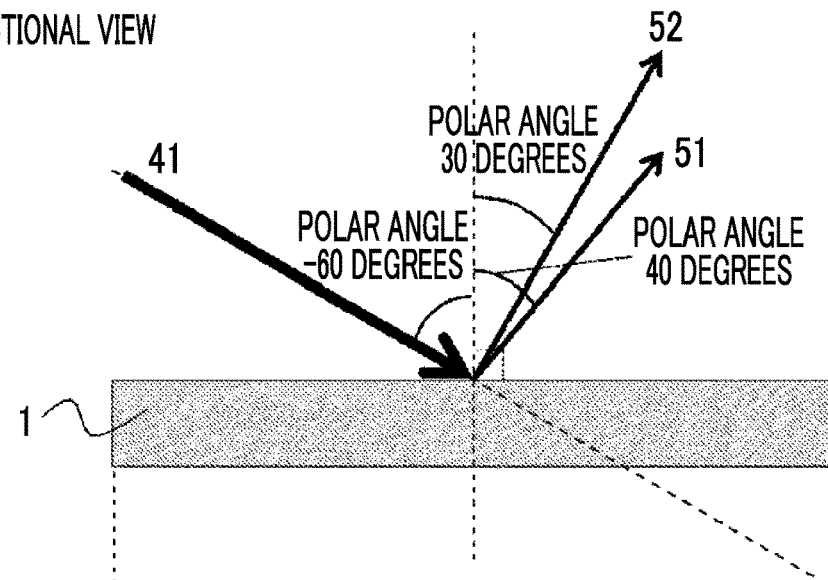
FIG. 3 is a diagram schematically showing a method of measuring a reflectivity of a reflective screen according to Examples.
Figure 3:
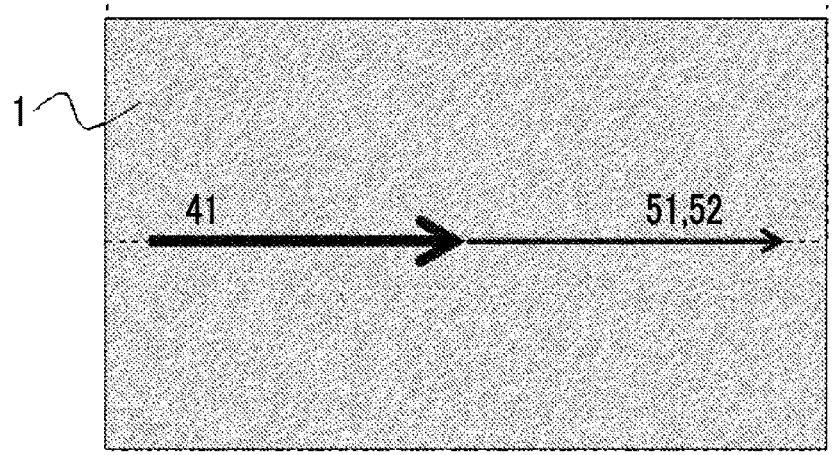

<Measurement of Reflectivity>
An incidence angle (polar angle, azimuthal angle), a light receiving angle (polar angle, azimuthal angle), and a measurement wavelength range were appropriately set such that light was incident from the R1 layer side shown in Table 2, and reflectivities R[−60,40](550) and R[−60,30](550) of the display member were measured using a gonio-spectrophotometric color measurement system (GCMS-3B, manufactured by Murakami Color Research Laboratory Co., Ltd.). Here, as shown in FIG. 3, R[−60,θ](550) represents a reflectivity of reflected light (51, 52) at a wavelength of 550 nm with respect to incidence light 41 incident into the display member at a polar angle of −60° that is measured at a light receiving angle having a polar angle of θ° with respect to an azimuthal angle shifted by 180° from an azimuthal angle of the incidence light.

<Measurement of Average Value of Peak-To-Peak Distances of Waving Structure>
In addition, in a case where a cross-section of the cholesteric liquid crystal layer of the reflective screen is observed using a scanning electron microscope (SEM), a stripe pattern including bright portions and dark portions was observed. From the waving structure of the stripe pattern, the distance in a plane direction of the cholesteric liquid crystal layer between the peaks or the valleys having an inclined angle of 0° at the two points most adjacent to each other was measured. The average value of peak-to-peak distances of the waving structure was obtained at all thicknesses in a case where the length of the cholesteric liquid crystal layer in a major axis direction of the cross-section was 100 μm.

<Evaluation of Glass-Bonded Product>
A glass plate having a size of length 50 mm×width 50 mm and a thickness of 2 mm was bonded to the R1 layer side of the reflective screen using an acrylic pressure sensitive adhesive SK-2057 (manufactured by Soken Chemical & Engineering Co., Ltd.). A projector (EB-G6250W, manufactured by Seiko Epson Corporation) was disposed on the glass side, and the visibility of a video was evaluated from the following viewpoints in a state where the video was focused on the glass. The evaluation was performed for two cases including a case where the light emitted from the projector was non-polarized light and a case where the light emitted from the projector was P polarized light.

A: a sufficiently bright real image having no blurriness was recognized

B: a real image was bright but was recognized to be slightly blurred

C: a real image was recognized but was dark

D: a real image was not able to be recognized

TABLE 2

| | | Example 1 | Example 2 |
|---|---|---|---|
| Name of display member | | RS-1 | RS-2 |
| Cholesteric liquid crystal layer | | R1 | R1 |
| | | G1 | G1 |
| | | B1 | B1 |
| Alignment layer | | Y1 | Y1 |
| Retardation layer A | Kind | None | RE-2 |
| | Re(550)[nm] | — | 140 |
| | Axis [°] | — | 135 |
| Integral reflectivity | | 22% | 22% |
| R[−60, 40](550)/R[60, 30](550) | | 3.6 | 3.6 |
| Average value of peak-to-peak distances of waving structure | | 9 | 9 |
| Evaluation of glass-bonded product | Real image visibility during incidence of non-polarized light | B | B |
| | Real image visibility during incidence of P polarized light | B | A |

TABLE 3

| | Configuration | Transmittance | |
|---|---|---|---|
| Example 1 | Reflective layer portion (Cholesteric liquid crystal) | 79% | |
| | Light control layer portion (PNLC) | ON 32% | OFF 88% |
| | Entire screen | 26% | 70% |
| Example 2 | Reflective layer portion (Cholesteric liquid crystal) | 75% | |
| | Light control layer portion (PNLC) | ON 32% | OFF 88% |
| | Entire screen | 24% | 66% |
| Comparative example 1 | Reflective layer portion (metal) | 70% | |
| | Light control layer portion (guest host type) | ON 20% | OFF 70% |
| | Entire screen | 14% | 49% |

Table 3 collectively shows the transmittances of Examples and Comparative Examples. In the field "Light Control Layer Portion" of Table 3, ON and OFF represent ON and OFF of current application to the light control layer 12. In Examples 1 and 2, by setting the current application to the light control layer 12 to ON, transmitted light from a scenery was able to be shielded, and a video was able to be observed without being affected by the scenery.

As shown in Table 3, by combining the configuration of the light reflecting layer 1 and the configuration of the light control layer 12 under appropriate conditions, the transmittance of the reflective screen 10 in a state where the transmittance of the light control layer 12 was the highest was able to set to be in a range of 50% or more. Accordingly, the scenery was able to be sufficiently observed. In addition, in a case where the transmittance of the light control layer 12 was the lowest, the light control layer 12 was able to be in a state where transmission of the scenery was not substantially allowed, and a video was able to be observed substantially without being affected by the scenery.

As described above, in the embodiment, the reflective screen 10 includes the light control layer 12. Therefore, the transmittance of light can be selectively changed by switching the current application to the light control layer 12. Accordingly, in order to see through a scenery, the light control layer 12 can be changed to a state where the transmittance is high, and in order to easily recognize a video, the light control layer 12 can be changed to a state where the transmittance is low. Therefore, the handleability is high.

(Modifications)

The present invention is not limited to the above-described embodiment, various modifications and changes can be made within the scope of the present invention.

(1) In the embodiment, a hard coat layer may be provided on the front surface or the rear surface of the reflective screen 10 in order to prevent scratches. The hard coat layer is formed, for example, by applying an ultraviolet curable resin (for example, urethane acrylate) having a hard coat function to the surface of the reflective screen 10.

In addition, instead of the hard coat layer, one layer or a plurality of layers having appropriately necessary functions such as an antireflection function, an ultraviolet absorbing function, an antifouling function, or an antistatic function may be selected and provided on the reflective screen 10 depending on the use environment, use purposes, and the like of the reflective screen 10. Further, a touch panel layer or the like may be provided on a side of the transparent support 4 opposite to the light reflective layer.

In particular, in a case where an antireflection layer is provided on a video source side surface of the reflective screen 10, video light reflected from the light reflecting layer 1 is reflected from an interface with air on the video source side and is emitted from the rear side to prevent the video from leaking to the rear side and being displayed.

(2) In the embodiment, the reflective screen 10 may be bonded to a plate-shaped member having light transmittance such as a glass plate.

(3) In the embodiment, the projection image display system is also applicable to, for example, an indoor partition, video display in an exhibition or the like, or a show window in a store or the like.

(4) In the embodiment, the example where the light control layer 12 is formed of PNLC is described. However, the present invention is not limited to this example, and a light control layer formed of a material other than liquid crystal only needs to be a device such as an EC type light control film where the brightness (transmittance) changes depending on a potential difference between electrodes and a voltage does not need to be applied constantly.

The light control film using an electrochromic (EC) type has a structure where the light control layer (electrolyte layer) is sandwiched between a pair of electrodes. Depending on a potential difference between the electrodes, the color of the light control layer changes between transparent and dark blue using a redox reaction.

An appropriate combination of each of the embodiments and the modifications can be used, and the detailed description will not be made. In addition, the present invention is not limited to each of the above-described embodiments.

EXPLANATION OF REFERENCES

1: light reflecting layer
2: alignment layer
3: retardation layer A
4: transparent support
10: reflective screen
11: transparent conductive layer
11a: first transparent conductive layer
11b: second transparent conductive layer
12: light control layer
12a: polymer network
12b: liquid crystal molecule 12c: domain
13: transparent substrate
13a: first transparent substrate
13b: second transparent substrate
14a: first transparent film
14b: second transparent film
20: light controller
21: alignment layer
21a: first alignment layer
21b: second alignment layer
30: pressure-sensitive adhesive layer
41: incidence light during measurement
51: reflected light at polar angle of 40 degrees during measurement
52: reflected light at polar angle of 30 degrees during measurement

What is claimed is:

1. A reflective screen that reflects video light projected from a projector to display a video and has transparency, the reflective screen comprising:
   a light reflecting layer where a central wavelength of selective reflection at a polar angle of 60° is present in a visible range,
   in which at least one layer of the light reflecting layer is formed of a layer having a cholesteric liquid crystal structure, senses of helix of all of layers having a cholesteric liquid crystal structure are the same, and Expression (1) is satisfied; and
   a transparent first electrode, a transparent second electrode, and a light control layer that are provided on a rear side with respect to the light reflecting layer in a thickness direction of the reflective screen, the second electrode being disposed to face the first electrode, and the light control layer being disposed between the first electrode and the second electrode,
   wherein the light control layer includes a polymer network and liquid crystal molecules and changes between a first state where light is scattered and a second state where transmission of light is allowed by changing a magnitude of a voltage applied to the light control layer through the first electrode and the second electrode, the polymer network having a three-dimensional net shape having a plurality of domains, and the liquid crystal molecules being positioned in the domains, $$R[-60,40](550)/R[-60,30](550) \geq 1.5 \quad \text{Expression (1)},$$

where $R[-60,40](550)$ represents a reflectivity at a wavelength of 550 nm with respect to incidence light incident into the reflective screen at a polar angle of $-60°$ that is measured at a light receiving angle having a polar angle of 40° with respect to an azimuthal angle shifted by 180° from an azimuthal angle of the incidence light, and $R[-60,30](550)$ represents a reflectivity at a wavelength of 550 nm with respect to incidence light incident into the reflective screen at a polar angle of $-60°$ that is measured at a light receiving angle having a polar angle of 30° with respect to an azimuthal angle shifted by 180° from an azimuthal angle of the incidence light.

2. The reflective screen according to claim 1, wherein the layer having a cholesteric liquid crystal structure is a cholesteric liquid crystal layer that is formed in a layer shape.

3. The reflective screen according to claim 2, wherein the cholesteric liquid crystal layer has a stripe pattern including bright portions and dark portions that is observed with a scanning electron microscope in a cross-section, the stripe pattern has a waving structure, and an average value of peak-to-peak distances of the waving structure is 0.5 μm to 50 μm,
   the waving structure refers to a structure in which at least one region M where an absolute value of an inclined angle of a continuous line of the bright portions or the dark portions in the stripe pattern with respect to a plane of the cholesteric liquid crystal layer is 5° or more is present, and peaks or valleys having an inclined angle of 0° are specified at two points most adjacent to each other with the region M interposed between the two points, and
   the peak-to-peak distance of the waving structure refers to a value obtained by measuring a distance in a plane direction of the cholesteric liquid crystal layer between the peaks or the valleys having an inclined angle of 0° at the two points most adjacent to each other with the region M interposed between the two points and obtaining an average of distance values at all thicknesses in a case where the length of the cholesteric liquid crystal layer in a major axis direction of the cross-section is 100 μm.

4. The reflective screen according to claim 2, wherein a maximum reflectivity of integral reflectivity at a wavelength of 620 to 680 nm is 15% to 28%.

5. The reflective screen according to claim 2, wherein a transmittance of the reflective screen in a state where a transmittance of the light control layer is the highest is 51% or more and 85% or less.

6. The reflective screen according to claim 2, wherein an average value of domain diameters of the polymer network is 0.1 μm or more and 3 μm or less.

7. The reflective screen according to claim 2, wherein a thickness of the light control layer is 5 μm or more and 50 μm or less.

8. The reflective screen according to claim 2, wherein in the light control layer, a density of the domains is $2 \times 10^7$ pieces/mm³ or more and $2 \times 10^{12}$ pieces/mm³ or less.

9. The reflective screen according to claim 2, further comprising:
   a retardation layer A that consists of a λ/2 retardation layer or a λ/4 retardation layer.

10. The reflective screen according to claim 1, wherein a maximum reflectivity of integral reflectivity at a wavelength of 620 to 680 nm is 15% to 28%.

11. The reflective screen according to claim 1, wherein a transmittance of the reflective screen in a state where a transmittance of the light control layer is the highest is 51% or more and 85% or less.

12. The reflective screen according to claim 1, wherein an average value of domain diameters of the polymer network is 0.1 μm or more and 3 μm or less.

13. The reflective screen according to claim 1, wherein a thickness of the light control layer is 5 μm or more and 50 μm or less.

14. The reflective screen according to claim 1, wherein in the light control layer, a density of the domains is $2 \times 10^7$ pieces/mm³ or more and $2 \times 10^{12}$ pieces/mm³ or less.

15. The reflective screen according to claim 1, further comprising:
   a retardation layer A that consists of a λ/2 retardation layer or a λ/4 retardation layer.

16. The reflective screen according to claim 1,
wherein the light control layer is bonded to a transparent support through a pressure-sensitive adhesive layer, the transparent support supporting the light reflecting layer.

17. A projection image display system comprising:
the reflective screen according to claim 1; and
a projector that projects video light to the reflective screen.

18. The projection image display system according to claim 17,
wherein incidence light projected from the projector and incident into the reflective screen is p polarized light that vibrates in a direction parallel to an incident surface.

19. The projection image display system according to claim 17,
wherein the incidence light is incident at an angle of 40° or more and 70° or less with respect to a normal line of the reflective screen.

20. The projection image display system according to claim 17, further comprising:
a voltage application unit; and
a controller,
wherein the light control layer further includes a pair of alignment layers,
among the pair of alignment layers, one alignment layer is positioned between a front surface of the light control layer and the first electrode and another alignment layer is positioned between a rear surface of the light control layer and the second electrode,
the voltage application unit applies an alternating current voltage to the light control layer through the first electrode and the second electrode, and
the controller controls driving of the projector and driving of the voltage application unit such that a period of a frame in the projector and a period of the alternating current voltage in the voltage application unit are different from each other.

\* \* \* \* \*